(12) United States Patent
Kamimaeda et al.

(10) Patent No.: US 8,244,751 B2
(45) Date of Patent: Aug. 14, 2012

(54) INFORMATION PROCESSING APPARATUS AND PRESENTING METHOD OF RELATED ITEMS

(75) Inventors: Naoki Kamimaeda, Kanagawa (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 12/429,292

(22) Filed: Apr. 24, 2009

(65) Prior Publication Data

US 2009/0271403 A1 Oct. 29, 2009

(30) Foreign Application Priority Data

Apr. 28, 2008 (JP) ................ P2008-117304

(51) Int. Cl.
G06F 17/00 (2006.01)
(52) U.S. Cl. .................. 707/767; 707/723
(58) Field of Classification Search .......... 707/723, 707/758, 767, 710, 780
See application file for complete search history.

(56) References Cited

U.S. PATENT DOCUMENTS

2008/0077575 A1* 3/2008 Tateno et al. .............. 707/5

FOREIGN PATENT DOCUMENTS

| JP | 08-147324 | 6/1996 |
| JP | 2004-062237 | 2/2004 |
| JP | 2005-57713 | 3/2005 |
| WO | WO 2006/059295 A1 | 6/2006 |
| WO | WO 2006/059297 A2 | 6/2006 |
| WO | WO 2007/058723 A1 | 5/2007 |

OTHER PUBLICATIONS

Extended European Search Report and Opinion issued in European Patent Application No. 09156371.8; Date of Mailing: Jan. 2, 2012.

* cited by examiner

*Primary Examiner* — Belix M Ortiz
(74) *Attorney, Agent, or Firm* — Finnegan, Henderson, Farabow, Garrett & Dunner, L.L.P.

(57) ABSTRACT

The present invention provides an information processing apparatus including: a first similarity degree calculating section for calculating the degree of similarity between a predetermined item and a calculation target item; and a related item determining section for determining a predetermined quantity of the calculation target items as the related items of the predetermined items in the descending order of the degree of similarity, wherein meta information related to the calculation target item based on the behavior history of user is added to the predetermined items and the degree of similarity between the predetermined item and the calculation target item is calculated.

10 Claims, 28 Drawing Sheets

FIG.2

TABLE 1: EXAMPLE OF OPERATION LOG DB102

| ITEM ID | USER ID | LOG TYPE | LOG RECORDING DATE |
|---|---|---|---|
| 1001 | 1 | reserve | 2007-12-05 08:39:44 |
| 1003 | 3 | detail | 2007-12-05 08:39:51 |
| 1009 | 1 | good | 2007-12-05 08:39:52 |
| 1010 | 3 | reserve | 2007-12-05 08:39:53 |
| 1011 | 2 | detail | 2007-12-05 08:39:54 |
| 1001 | 2 | detail | 2007-12-05 08:39:45 |
| 1003 | 1 | good | 2007-12-05 08:39:46 |
| 1004 | 2 | reserve | 2007-12-05 08:39:47 |
| 1005 | 2 | detail | 2007-12-05 08:39:48 |
| 1001 | 3 | bad | 2007-12-05 08:39:49 |
| 1001 | 4 | reserve | 2007-12-05 08:39:50 |
| 1001 | 3 | bad | 2007-12-05 08:40:02 |

FIG.3

TABLE 2: EXAMPLE OF ACCESS WEIGHT LOG DB106

| ITEM ID | USER ID | PREFERENCE | INITIAL REGISTRATION DATE | UPDATE DATE |
|---|---|---|---|---|
| 1001 | 1 | 3.0 | 2007-12-05 08:39:44 | 2007-12-05 08:39:44 |
| 1001 | 2 | 1.0 | 2007-12-05 08:39:45 | 2007-12-05 08:39:45 |
| 1002 | 1 | 3.0 | 2007-12-05 08:39:46 | 2007-12-05 08:39:46 |
| 1003 | 3 | 4.0 | 2007-12-05 08:39:47 | 2007-12-05 08:39:47 |
| 1003 | 5 | 5.0 | 2007-12-05 08:39:48 | 2007-12-05 08:39:48 |
| 1005 | 2 | 6.0 | 2007-12-05 08:39:49 | 2007-12-05 08:39:49 |
| 1005 | 3 | 7.0 | 2007-12-05 08:39:50 | 2007-12-05 08:39:50 |
| 1005 | 1 | 1.3 | 2007-12-05 08:39:51 | 2007-12-05 08:39:51 |
| 1010 | 2 | 2.4 | 2007-12-05 08:39:52 | 2007-12-05 08:39:52 |
| 1011 | 4 | 4.7 | 2007-12-05 08:39:53 | 2007-12-05 08:39:53 |
| 1011 | 5 | 5.7 | 2007-12-05 08:39:54 | 2007-12-05 08:39:54 |
| 1011 | 6 | 4.3 | 2007-12-05 08:39:55 | 2007-12-05 08:39:55 |

FIG.4

TABLE 3: EXAMPLE OF RELATED ITEM META DB110

| ITEM ID | RELATED ITEM ID | DEGREE OF RELATION | INITIAL REGISTRATION DATE | UPDATE DATE |
|---|---|---|---|---|
| 1001 | 1002 | 1.5 | 2007-12-05 08:39:44 | 2007-12-05 08:39:44 |
| 1001 | 1003 | 3.4 | 2007-12-05 08:39:45 | 2007-12-05 08:39:45 |
| 1002 | 1004 | 2.5 | 2007-12-05 08:39:46 | 2007-12-05 08:39:46 |
| 1003 | 1001 | 6.4 | 2007-12-05 08:39:47 | 2007-12-05 08:39:47 |
| 1003 | 1005 | 2.3 | 2007-12-05 08:39:48 | 2007-12-05 08:39:48 |
| 1005 | 1001 | 4.0 | 2007-12-05 08:39:49 | 2007-12-05 08:39:49 |
| 1005 | 1004 | 5.6 | 2007-12-05 08:39:50 | 2007-12-05 08:39:50 |
| 1005 | 1010 | 2.0 | 2007-12-05 08:39:51 | 2007-12-05 08:39:51 |
| 1010 | 1001 | 1.0 | 2007-12-05 08:39:52 | 2007-12-05 08:39:52 |
| 1011 | 1003 | 5.4 | 2007-12-05 08:39:53 | 2007-12-05 08:39:53 |
| 1011 | 1004 | 0.3 | 2007-12-05 08:39:54 | 2007-12-05 08:39:54 |
| 1011 | 1005 | 1.0 | 2007-12-05 08:39:55 | 2007-12-05 08:39:55 |

FIG.5

TABLE 4: EXAMPLE OF ITEM INFORMATION DB114

| ITEM ID | META TYPE (ATTRIBUTE ID) | META (ATTRIBUTE VALUE) | UPDATE FREQUENCY | IMPORTANCE VALUE |
|---|---|---|---|---|
| 1001 | 1 | 153144 | 1 | 1.584543 |
| 1002 | 1 | 153144 | 1 | 1.584543 |
| 1003 | 1 | 153144 | 1 | 1.584543 |
| 1004 | 1 | 153144 | 1 | 1.584543 |
| 1005 | 1 | 153144 | 1 | 1.584543 |
| 1006 | 1 | 153144 | 1 | 1.584543 |
| 1007 | 1 | 153144 | 1 | 1.584543 |
| 1008 | 1 | 153144 | 1 | 1.584543 |
| 1009 | 1 | 153144 | 1 | |
| ... | ... | ... | ... | ... |
| 1014 | 1 | 153144 | 1 | 1.584543 |

FIG.13

TABLE 5: EXAMPLE OF USER PREFERENCE INFORMATION DB204

| USER ID | META TYPE (ATTRIBUTE ID) | META (ATTRIBUTE VALUE) | IMPORTANCE VALUE |
|---|---|---|---|
| 1 | 1 | 30 | 0.5 |
| 1 | 2 | 2 | 0.3 |
| 1 | 2 | 4 | 1.3 |
| 1 | 2 | 52 | 4.4 |
| 1 | 2 | 256 | 12.4 |
| 1 | 2 | 34 | 3.4 |
| 1 | 6 | 2 | 0.9 |
| 1 | 6 | 45 | 0.7 |
| 1 | 6 | 6 | 4.1 |
| 1 | 6 | 3 | 2.3 |
| 1 | 11 | 4 | 0.8 |
| 2 | 1 | 63 | 1.2 |
| 2 | 2 | 4 | 0.3 |
| 2 | 2 | 45 | 0.6 |
| 2 | 2 | 65 | 8.7 |
| 2 | 5 | 76 | 3.2 |
| 2 | 6 | 3 | 0.8 |
| 2 | 11 | 53 | 0.9 |
| ⋮ | ⋮ | ⋮ | ⋮ |

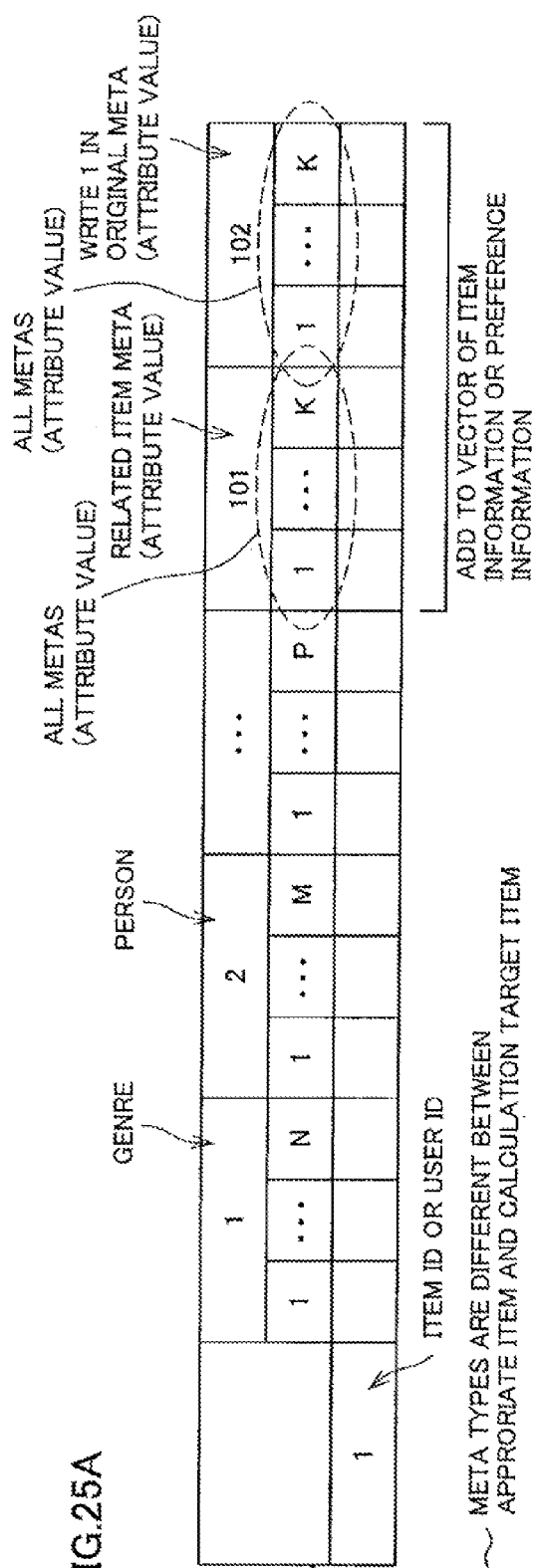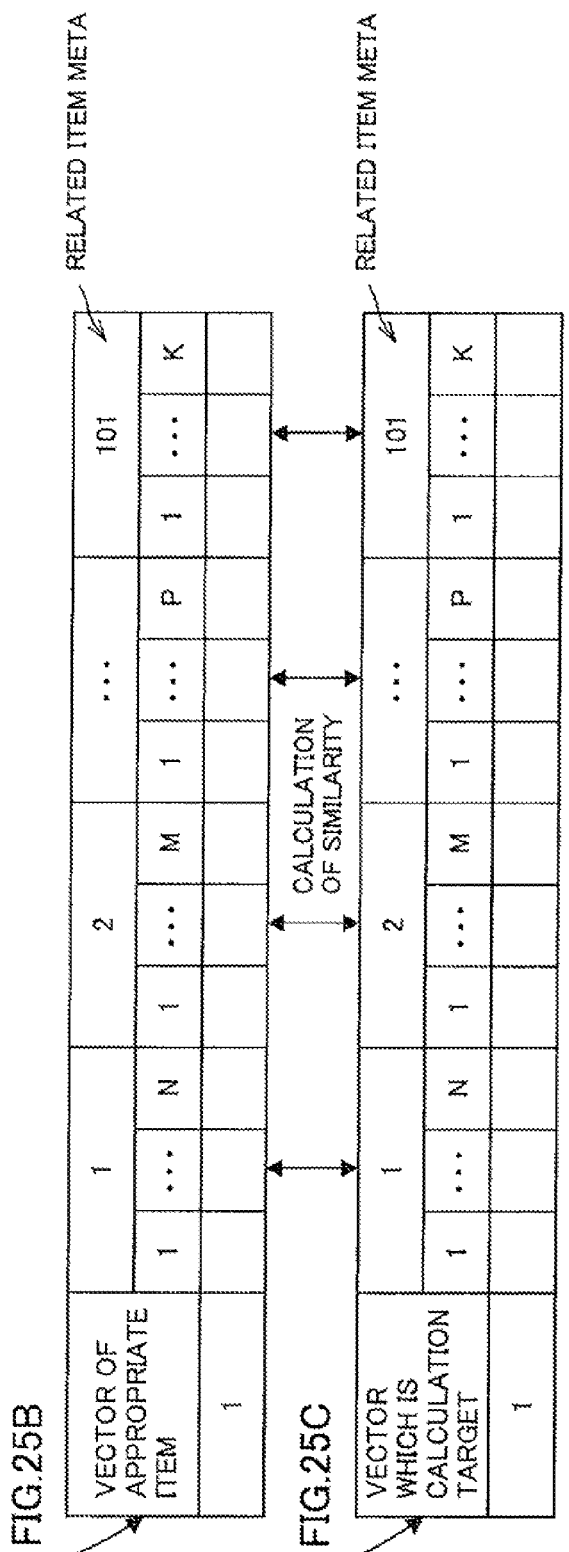

INFORMATION PROCESSING APPARATUS AND PRESENTING METHOD OF RELATED ITEMS

CROSS REFERENCES TO RELATED APPLICATIONS

The present invention contains subjected matter related to Japanese Patent Application JP 2008-117304 filed in the Japan Patent Office on Apr. 28, 2008, the entire contents of which being incorporated herein by reference.

BACKGROUND OF THE INVENTION

1. Field of the Invention

The present invention relates to an information processing apparatus and a presenting method of related items.

2. Description of the Related Art

In recent years, a large amount of information has been provided through a network with a rapid progress of information processing technology and communication technology. With diversified types of the information apparatuses possessed by users, diversified kinds of information have been presented. For example, some kind of information is distributed to a personal computer (hereinafter referred to as PC) and the like through a wide range network such as Internet and other kind of information such as broadcasting program and broadcasting information is distributed to a TV receiver and the like. In views of such circumstances, public attention has been paid to a technology for providing information preferred by users (hereinafter referred to as preference information) effectively out of enormous information. For example, high interests have been paid to a technology for selecting information more conforming to user's preference without any omission.

In relation with this kind of the technology, for example, Japanese Patent Application Laid-Open No. 2005-57713 has described an information processing apparatus for providing more appropriate information to user by taking the preference of individual user into account. This information processing apparatus has a function for calculating the degree of correlation between users using data regarding the preferences of plural users. Further, for example, as regarding two users related to a kind of the degree of correlation, this information processing apparatus has a function for, if a user does not have a factor which other user has, providing a factor related to that factor to that user. That is, the information which is not presented to the user even if his or her operation history or the like is used comes to be provided based on the degree of relation between the user and related other user.

SUMMARY OF THE INVENTION

In addition to the technology disclosed in Japanese Patent Application Laid-Open No. 2005-57713, for example, technologies such as collaborative filtering (CF) and content based filtering (CBF) are known. The collaborative filtering method refers to a method for estimating the information which should be automatically presented to a certain user using other user information similar to his or her preference with preference information regarding a number of users accumulated. On the other hand, the content based filtering is a method for extracting a content related to a certain content based on the degree of similarity between the contents. The systems which provide information using these methods are sometimes called a recommendation system.

As described above, the collaborative filtering is a method for providing information based on the degree of relation between behavior histories of users. That is, this method provides indirectly related information with respect to a certain content extracted from the behavior history of user but not providing information directly related to a certain content. Further, the collaborative filtering does not extract information conforming to the preference of user unless a predetermined quantity of preference information pieces or more are collected. Additionally, if the number of information pieces extracted based on the operation history of user or the like is not sufficient, that number is difficult to increase. On the other hand, the content based filtering aims at providing information directly related to a content and thus, it does not provide the indirectly related information with respect, to the content extracted from the behavior history of user or the like.

Accordingly, the present invention has been achieved in views of the above-described issues and it is desirable to provide a novel and improved information processing apparatus capable of calculating a related content by taking information directly related to the content and information indirectly related to the content into account and a presenting method of related items.

In order to solve the above issue, according to an embodiment of the present invention, there is provided an information processing apparatus including; a first similarity degree calculating section which calculates the degree of similarity between a predetermined item and a calculation target item; and a related item determining section which determines the calculation target items of a predetermined quantity as the related item of the predetermined item in the descending order of the degree of similarity, wherein meta information related to the calculation target item is added to the predetermined item based on behavior history of user so as to calculate the degree of similarity between the predetermined item and the calculation target item.

The aforementioned information processing apparatus calculates the degree of similarity between a predetermined item and a calculation target item by means of the first similarity degree calculating section. Further, this information processing apparatus determines a predetermined quantity of the calculation target items to be related items of the predetermined item in the descending order of the degree of similarity by means of the related item determining section. Then, this information processing apparatus adds meta information related to the calculation target item based on the behavior history of user to the predetermined item and calculates the degree of similarity between the predetermined item and the calculation target item.

The information processing apparatus may further include a relation degree adding section which, when the calculation target item is contained in related items related to the predetermined item, adds the degree of relation of the calculation target item to the degree of similarity of the calculation target item calculated by the first similarity degree calculating section.

The information processing apparatus may further include: a relation degree acquiring section which acquires the degree of relation of the related item related based on the behavior history of user for a candidate item which holds the same meta information as the meta information of a predetermined item; a similarity degree acquiring section which acquires the degree of similarity between the predetermined item and the related item or the candidate item; a second similarity degree calculating section which calculates the similarity degree between the related item or the candidate item and the predetermined item based on the degree of relation and the degree of similarity; and a related item adding section which, when the quantity of the related items determined by the related item determining section is less than the predetermined quantity, selects items in the descending order in terms of the degree of similarity calculated try the second similarity degree calculating section and adds to the related items.

The second similarity degree calculating section may, when a degree of similarity between the predetermined item and the related item is acquired by the similarity degree acquiring section, multiply the degree of similarity by the degree of relation and regards that multiplication value as a degree of similarity between the predetermined item and the candidate item. In this case, the related item adding section selects the candidate items in the descending order of the degree of similarity calculated by the second similarity degree calculating section and adds to the related items.

The second similarity degree calculating section may, when the degree of similarity between the predetermined item and the candidate item is acquired by the similarity degree acquiring section, multiply the degree of similarity by the degree of relation and regards its multiplication value as a degree of similarity between the predetermined item and the related item. In this case, the related item adding section selects the related items in the descending order of the degree of similarity calculated by the second similarity degree calculating section and adds to the related items.

The relation degree acquiring section may be so constructed to acquire the degree of relation of the related item for the candidate item which holds meta information having a high degree of priority set for each meta information preliminarily of the meta information held by the predetermined items.

The information processing apparatus may further include a priority degree setting section which sets the degree of priority of each meta information corresponding to the preference of user who accesses the predetermined items or the statistical data of the meta information held by the predetermined item. In this case, the relation degree acquiring section acquires a degree of relation of the related item for the candidate item which holds meta information having a high degree of priority set by the priority degree setting section of the meta information held by the predetermined item.

The relation degree acquiring section may acquire the degree of relation of the related item for the candidate items which hold all meta information held by the predetermined item, integrate all the degrees of relation for each of the candidate items and regard as the degree of relation of the candidate item.

Assuming that an item related to the predetermined item is a first related item and an item related to a N−1-th related item (N≧2) is a N-th related item, the relation degree acquiring section may multiply all the degrees of relation (2≧K≧N) between the K−1-th related item and the K-th related item so as to acquire the degree of relation between the first related item and the N-th related item.

The information processing apparatus may further include a related item presenting section which sorts the related items in the descending order of the preference of the user so as to present to the user.

In order to solve the above issue, according to another embodiment of the present invention, there is provided a related item presenting method including the steps of: adding the meta information related to a calculation target item based on the behavior history of user to a predetermined item; calculating the degree of similarity between the predetermined item and the calculation item; determining a predetermined quantity of the calculation target, items to be the related item of the predetermined item in the descending order of the degree of similarity; and presenting the related item to user, the steps being achieved by an information processing apparatus.

According to the embodiments of the present invention described above, a related content which takes information related directly to and information related indirectly to a content into account can be calculated. Particularly, results by the collaborative filtering can be calculated together within the frame of the content based filtering.

BRIEF DESCRIPTION OF THE DRAWINGS

FIG. 2 is an explanatory diagram showing a configuration example of an operation log DB according to the embodiment;

FIG. 3 is an explanatory diagram showing a configuration example of an access weight DB according to the embodiment;

FIG. 4 is an explanatory diagram showing a configuration example of a related item meta DB according to the embodiment;

FIG. 5 is an explanatory diagram showing a configuration example of an item information DB according to the embodiment;

FIG. 13 is an explanatory diagram showing a configuration example of user preference information DB according to the embodiment;

FIGS. 25A, 25B and 25C are an explanatory diagram showing a calculation method for the degree of similarity of the related item according to the embodiment;

DETAILED DESCRIPTION OF THE PREFERRED EMBODIMENTS

Figure 1:
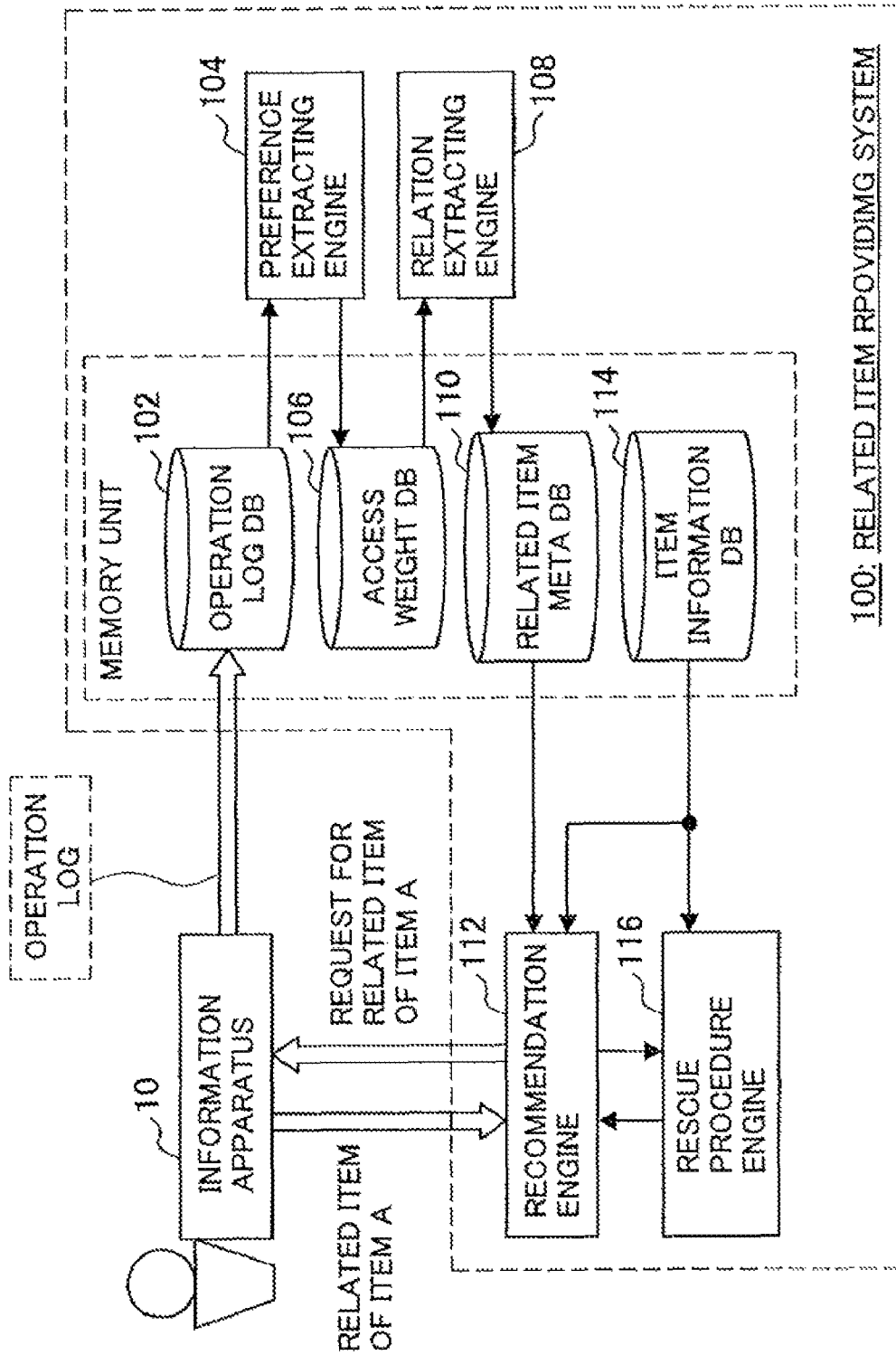
FIG. 1 is an explanatory diagram showing a system configuration of a related item providing system according to a first embodiment, of the present invention.

Hereinafter, preferred embodiments of the present invention wall be described in detail with reference to the appended drawings. Note that, in this specification and the appended drawings, structural elements that have substantially the same function and structure are denoted with the same reference numerals, and repeated explanation of these structural elements is omitted.

As a technology for selecting information conforming to the preference of user (hereinafter referred to as providing target user) upon providing the user with information, a technology called collaborative filtering has been known. According to this technology, for example, a similar user to the providing target user is searched based on the operation history of that providing target user or the like and a recommended item which should be provided is calculated from related items related to the similar user. Particularly, of the related items of the similar user, an item not related to the providing target user is provided to the providing target user. That is, the recommended item is extracted indirectly through the similarity between the risers.

If picking up a specific example, a processing by the collaborative filtering is as follows. First, a similar user to the providing target user is found out based on the operation history of the providing target user. Next, an item which the similar user prefers is extracted and then, a processing of, if the providing target user does not know the item preferred by the similar user, recommending that not known item to the providing target user is executed. The item preferred by the similar user is the aforementioned related item. As evident from this example, no direct relation between the providing target user and the recommended item is considered. In other words, no direct relation between an item recommended to the providing target user and an item originally preferred by the providing target user is considered.

As described above, the relation between the providing target user and the recommended item is calculated indirectly through a similarity between the providing target user and the similar user. Thus, the direct relation between a related item originally related to the providing target user and the recommended item is not considered in the collaborative filtering. In the meantime, the items mentioned here include user himself or herself as well as contents of broadcasting programs and information relating to the content (for example, program information and the like). Therefore, referring to the aforementioned example, the relation between the providing target user and the similar user corresponds to a relation between directly related items. Further, the relation between the similar user and the recommended item corresponds to the direct relation also. However, the relation between the providing target user and the recommended item can be said to be a relation between indirectly related items via a similar user.

In an initial period just after the providing service of related items is started, the frequency of access to an item providing server is often low and further, the number of users is often small. In this case, a recommendation system using the aforementioned collaborative filtering can hardly provide any related item well conforming to the preference of user easily because it is difficult to acquire the preference information of the user sufficiently (so-called cold start issue). Although, of course, the number of the related items provided increases with a passage of time, no sufficient number of the related items may be provided in the initial period just after the service is started. Thus, technologies for expanding the preference information of user have been under a research.

For example, a technology for expanding the preference information of user by forecasting meta-information which user might prefer and using its forecast result has been proposed. Use of this technology expands the number of the preference information pieces to be used in executing the collaborative filtering, so that a sufficient, number of the related items can be provided even in the initial period just after the service is started up. That is, this technology is a technology for expanding the preference information of user based on a forecast.

On the other hand, a technology of calculating the degree of similarity between items to recommend an item having a high similarity as a related item has been known. This technology is a technology for calculating the related item by considering only the direct relation between the items and called content based filtering. For example, the recommendation system using this technology retrieves an item relating to the item preferred by a providing target user and recommends a found out item to the providing target, user.

A specific recommendation processing will be described here. The recommendation system using the content based filtering calculates a vector quantity called item vector for each of plural items and then calculates the degree of similarity between items based on that item vector. At this time, the recommendation system generates the item vector based on the meta-information provided to each item. As evident from the aforementioned processing content, the content based filtering calculates a recommended item based on the degree of direct similarity between the items, different from the above-mentioned collaborative filtering. As for an item whose provided meta-information is small, sometimes it is difficult to calculate any related item related to that item.

The embodiment proposed by the inventor of the present invention provides a technology for extracting a related item based on the degree of direct similarity between items like the content based filtering while considering the indirect relation between the items like the aforementioned collaborative filtering. In related art, if it is intended to provide a related item by considering both the direct similarity between the items and the indirect relation between the items via a relation between users, it is necessary to execute a calculation of the collaborative filtering and a calculation of the content based filtering separately.

However, use of the technology according to the embodiments mentioned below eliminates a necessity for redundant calculations, thereby simplifying arithmetic processing. Consequently, it is expected that arithmetic operation load applied to the calculation processing of the related item and its arithmetic operation time are reduced. Further, because the technology according to the embodiments mentioned below includes factors of the content, based filtering, it provides a solution for the above-described cold start issue.

First Embodiment

First, the first embodiment of the present invention will be described. This embodiment concerns a calculation method for the related item which enables a result by the collaborative-filtering (CF) to be calculated together within a frame of the content-based-filtering (CBF). Hereinafter, an application method of the related item meta, a calculation method for the related item based on the related item meta and a presentation method of the related item will be described in this order. First, a configuration example of a related item providing system 100 capable of achieving these methods will be described.

[Configuration Example of Related Item Providing System 100]

Referring to FIG. 1, the system configuration of the related item providing system 100 of this embodiment will be described, FIG. 1 is an explanatory diagram showing a configuration example of the related item providing system 100 of this embodiment.

As shown in FIG. 1, the related item providing system 100 includes mainly an operation log DB 102, a preference extracting engine 104, an access weight DB 106, a relation extracting engine 108, an related item meta DB 110, a recommendation engine 112, an item, information DB 114 and a rescue procedure engine 116.

The related item providing system 100 is connected to an information apparatus 10 operated by user directly or via a network in order to acquire an operation log of the information apparatus 10 and provide a related item to the information apparatus 10. Although only one information apparatus 10 is represented in FIG. 1 for convenience, two or more may be provided.

In the meantime, the operation log DB 102, the access weight DB 106, the related item meta DB 110 and the item information DB 114 are stored in a predetermined memory unit. For example, this memory unit corresponds to a RAM 906, a memory section 920, a removable memory medium 928 or the like in a hardware configuration example described later.

(Operation Log DB 102)

The operation log DB 102 is a database (DB) which stores the operation log of the information apparatus 10. That is, information of the operation log and the like of the information apparatus 10 is acquired by the related item providing system 100 and stored in the operation log DB 102. Information stored in the operation log DB 102 is read out by a preference extracting engine 104 described later.

Referring to FIG. 2, a configuration example of the operation log DB 102 will be described. FIG. 2 is an explanatory diagram (Table 1) showing a configuration example of the operation log DB 102 according to this embodiment. In the example of Table 1, the operation log DB 102 has columns about item ID, user ID (member ID), log type and log recording date (log time).

The information to be recorded in the column of the item ID is identification information (ID) indicating each item. The information to be recorded in the column of the user ID is identification information (ID) indicating each user. The information to be recorded in the column of the log type is information indicating the type of each operation log. The information to be recorded in the column of the log recording date is information indicating a date when the operation log of that record is recorded.

If referring to, for example, item ID=1011, 2 is recorded in the user ID, "detail" is recorded in the log type and "2007-12-05 08:39:54" is recorded in the log recording date. That is, the item ID=1011 indicates that user with user ID of 2 has made an access at 8 o'clock 39 minutes 54 seconds, Dec. 5, 2007. Further, the log type of "detail" indicates that the detailed information of that item has been enjoyed. The configuration shown in Table 1 shows only an example and the operation log of user is recorded together with the time information like this example.

(Preference Extracting Engine 104)

Refer to FIG. 1 again. The preference extracting engine 104 acquires an operation log of user from the operation log DB 102 and calculates an access weight to each item for each user. An access weight calculated by the preference extracting engine 104 is stored in an access weight DB 106 described later. In the meantime, the access weight mentioned here is an index indicating how a certain user prefers a particular item and is information indicating the degree of preference. For example, if the preference of user with user ID of 2 to an item with item ID of 1011 is strong, an access weight to user ID of 2 and item ID of 1011 turns to a large value. That is, the access weight is an example of the preference information. The calculation method of this access weight will be described later.

(Access Weight DB 106)

The access weight DB 106 is a database in which the access weight calculated by the preference extracting engine 104 is stored. In other words, the access weight DB 106 is a database for storing a result (preference information) obtained by analyzing the operation log of user. The information stored in the access weight DB 106 is read out by a relation extracting engine 108 described later.

Here, the configuration example of the access weight DB 106 will be described with reference to FIG. 3. FIG. 3 is an explanatory diagram (Table 2) showing a configuration example of the access weight DB 106 according to this embodiment. In the example of Table 2, the access weight DB 106 has columns about item ID (item ID), user ID (member ID), degree of preference (access weight), initial registration date (entry time) and update date (update time).

The information to be recorded in the column of the item ID is identification information (ID) indicating each item. The information to be recorded in the column of the user ID is identification information (ID) indicating each user. The information to be recorded in the column of the degree of preference is information indicating the degree of preference of each user to each item. That is, the access weight calculated by the preference extracting engine 104 is recorded in this column. The information to be recorded in the column of the initial registration date is time information indicating a date when the initial registration is made in each record of the access weight DB 106. The information to be recorded in the column of the update date is time information indicating a date when each record of the access weight DB 106 is updated.

For example, referring to a record of item ID of 1010, it is evident that the degree of preference to an item with an item ID of 1010 of user with user ID of 2 is 2.4. Further, it is evident that the degree of preference of this user has not been updated since the initial registration at 8 o'clock 40 minutes 52 seconds, Dec. 5, 2007. Further, the degree of preference to an item with an item ID of 1001 and the degree of preference to an item with an item ID of 1005 are recorded about user with a user ID of 2 in the access weight DB 106 of Table 2. The preference to an item with an item ID of 1001 is 1.0. On the other hand, the preference to an item with an item ID of 1005 is 6.0.

Thus, it is evident from the example of Table 2 that user with a user if) of 2 prefers an item with an item ID of 1005 most. Then, it is also evident that user with user ID of 2 has a high preference to the item with item ID of 1010 and the item with item ID of 1001 in this order. The configuration shown in Table 2 is an example. As the preference information, user ID, item ID and time information, are recorded in the access weight DB 106 like this example, in order to control the degree of preference of each user.

As described above, the access weight DB 106 stores the user ID, item ID and degree of preference in a relation among them. For the reason, an item ID with a relatively high degree of preference is extracted and a user ID of user having extracted item IDs in common is extracted so as to calculate a similarity between users. That is, it is considered that there is a high similarity recognized between users each having a high degree of preference to an item with the same item ID. Further, it is also considered that there exists a certain relation among plural items to which the same user has each high degree of preference.

(Relation Extracting Engine 108)

See FIG. 1 again. The relation extracting engine 108 acquires information for calculating an item (related item) related to each item from the access weight. DB 106. This information includes the item ID, user ID and degree of preference. Then, the relation extracting engine 108 calculates a related item of each item using the acquired information. For example, the relation extracting engine 108 extracts plural items supplied with the degree of preference of the same user and relates these items with one another. At this time, one item turns to a related item of the other item. In the meantime, sometimes plural related items may be extracted.

At this time, the relation extracting engine 108 calculates the degree of relation indicating the intensity of the relation between a certain item (an appropriate item) and its related item. For example, the relation extracting engine 108 calculates the degree of the relation based on the degree of preference of the appropriate item and the degree of preference of the related item. At this time, the relation extracting engine 108 integrates the degree of preference of the given item and the degree of preference of the related item and normalizes that, integrated value to calculate a degree of relation. The information of the related item calculated by the relation extracting engine 108 is recorded in the related item meta DB 110. The degree of relation is a value calculated using a social relation based on user's operation history or working history or activities of community or the like.

(Related Item Meta DB 110)

The related item meta DB 110 is a database which stores information of the related item of each item calculated by the relation extracting engine 108 and the degree of the relation between respective items. The information stored in the related item meta DB 110 is read out by a recommendation engine 112 described later.

Here, the configuration example of the related item meta DB 110 will be described with reference to FIG. 4. FIG. 4 is an explanatory diagram (Table 3) showing the configuration example of the related item meta DB 110 according to this embodiment. In the example of Table 3, the related item meta DB 110 has columns about an item ID (item ID), related item ID (sim item ID), degree of relation (score), initial registration date (entry time) and update date (update time).

The information to be recorded in the column of the item ID is identification information (ID) indicating each item. The information to be recorded in the column of the related item ID is identification information (ID) indicating a related item of an item specified by the item ID. The information to be recorded in the column of the degree of relation is a degree of relation indicating the intensity of relation between an item specified by the item ID and an item specified by the related item ID. The information to be recorded in the column of the initial registration date is time information indicating a date when the initial registration is made in each record of the related item meta DB 110. The information to be recorded in the column of the update date is time information indicating a date when each record of the related item meta DB 110 is updated.

If searching for a record corresponding to an item with item ID of 1001 from the related item meta DB 110 shown in Table 3 is performed, a record with related item ID of 1002 and a record with related item ID of 1003 are detected. A degree of relation of 1.5 is recorded in the record with related item ID of 1002. On the other hand, a degree of relation of 3.4 is recorded in the record with related item ID of 1003. From these information pieces, it is evident that, the item with item ID of 1001 is related with two items corresponding to at least item ID of 1002 and item ID of 1003. Further, it is also evident that the item with item ID of 1001 has a higher relation with the item with item ID of 1003 than the item with item ID of 1002.

Thus, item ID, related item ID, and the degree of relation are associated to each other and recorded in the related item meta DB 110. Consequently, a related item ID supplied with a relatively high degree of relation is extracted and other item ID of item having the extracted related item ID in common is extracted so as to calculate relation between the items. That is, it is considered that a high degree of relation exists between the items having a high degree of relation with respect to the item, having the same related item ID.

The degree of relation recorded in the related, item meta DB 110 indicates a direct relation between the item with item ID and the item with the related item ID. On the other hand, the relation between the items calculated based on the related item meta DB 110 indicates an indirect relation obtained via the related item.

(Recommendation Engine 112)

See FIG. 1 again. The recommendation engine 112 provides the related item of each item to the information apparatus 10 based on information recorded in the related item meta DB 110. For example, if a related item of an item A is requested by the information apparatus 10, the recommendation engine 112 refers to the related item ID of the item A recorded in the related item meta DB 110 and provides a related item corresponding to this related item ID to the information apparatus 10. At this time, the recommendation engine 112 acquires any related item from an item information DB 114 described later. If the quantity of related items provided to the information apparatus 10 is lower than a predetermined quantity, the recommendation engine 112 acquires the related item from a rescue procedure engine 116 described later.

(Item Information DB 114)

The item information DB 114 is a database for storing attribute information applied to each item. The attribute information stored in the item information DB 114 is read out by the recommendation engine 112 and the rescue procedure engine 116 described later.

Here, a configuration example of the item information DB 114 will be described with reference to FIG. 5. FIG. 5 is an explanatory diagram showing a configuration example (Table 4) of the item information DB 114 according to this embodiment. In the example of Table 4, the item information DB 114 has columns about item ID (item ID), meta type (attribute ID), meta (value ID; attribute value), update frequency (nof times) and importance value (score).

The information to be recorded in the column of the item ID is identification information (ID) indicating each item. The information to be recorded in the column of the meta type is information indicating the type of the attribute information applied to each item. The identification information (ID) indicating for example, genre, person, keyword, broadcasting time, broadcasting station, titles and the like is recorded in this column. For example, the attribute value of each item is recorded in the column of meta. Identification information (ID) indicating "action", "YAMADA TARO", "New Year Day" and the like is recorded in this column. The information to be recorded in the column of the update frequency is the frequency of updating of the record. The information to be recorded in the column of the importance value is information indicating the importance value of meta recorded in that record. This importance value is calculated based on the appearance frequency or the like of that meta when the metas of all the items are referred to (for example, TF-IDF).

(Rescue Procedure Engine 116)

See FIG. 1 again. The rescue procedure engine 116 calculates a related item in a different way from the recommendation engine 112 when it receives a request about the related item from the recommendation engine 112. If the quantity of the related items calculated based on the related item meta DB 110 or the like is lower than a predetermined quantity, the recommendation engine 112 requests the rescue procedure engine 116 for the related item. After receiving this request, the rescue procedure engine 116 provides a predetermined quantity of the related items to the recommendation engine 112 so that the quantity of the related items reach the predetermined quantity. A calculation method for the related item by the rescue procedure engine 116 will be described later.

The functional configuration of the related item providing system 100 of this embodiment has been described above. As described above, the related item providing system 100 calculates the related item of each item based on the operation history of user and relation between items. Thus, the related item can be calculated based on the relation between the items taking the preference of user into account. As described in the description of the access weight DB 106 and the related item meta DB 110, a direct, relation between the items and its indirect relation have been considered in this calculation.

Unless the quantity of the related items calculated by the recommendation engine 112 reaches a predetermined quantity, the predetermined quantity of the related items can be provided to the information apparatus 10 by replenishing the related item by means of the rescue procedure engine 116. In the above description, a detailed description of the calculation method of the relation and a calculation method of the importance value of the meta applied to each item is omitted. The providing method of the related item as well as the calculation method will be described in detail below.

[Providing Method of Related Item]

Figure 6:
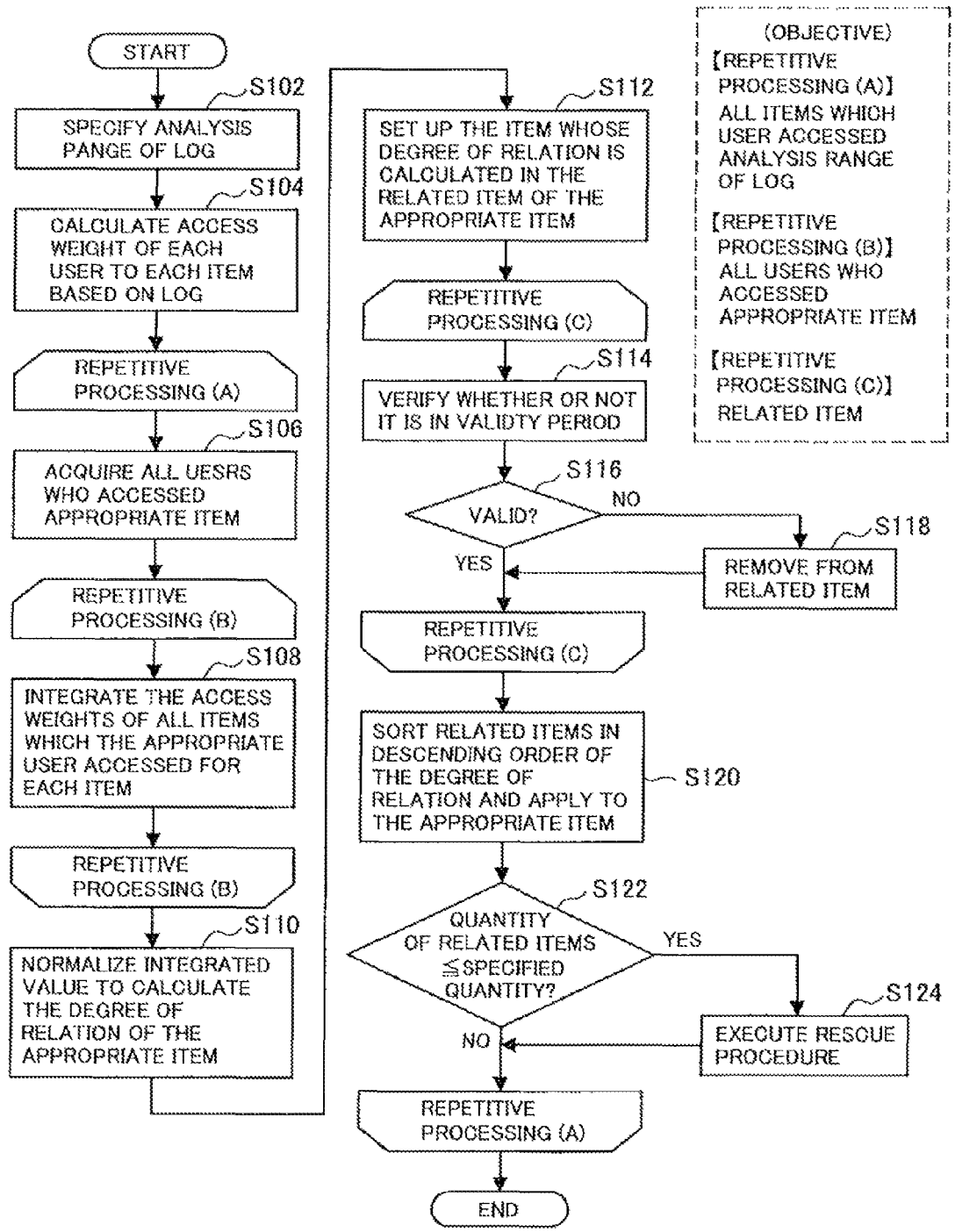
FIG. 6 is an explanatory diagram showing a flow of a related item providing method according to the embodiment.

Hereinafter, the related item providing method of this embodiment will be described in detail. The entire flow of the related item providing method of this embodiment will be described with reference to FIG. 6. FIG. 6 is an explanatory diagram showing an entire flow of the related item providing method according to this embodiment.

As shown in FIG. 6, first, an analysis range of the operation log stored in the operation log DB 102 is specified by the preference extracting engine 104 (S102). As the analysis range of the operation log, for example, a startup date and termination date of a log recording date of the operation log are specified. Then, a record included in the analysis range is specified by the preference extracting engine 104.

Next, the preference extracting engine 104 calculates an access weight of each combination of the item ID and user ID based on the operation log recorded in the record of the analysis range (S104). If there exist a plurality of records having the same combination of the item ID and user ID, the preference extracting engine 104 integrates the access weights calculated from the operation log recorded in each record and stores that integrated value in the access weight DB 106.

It is permissible to store not the integrated value but a maximum value of plural access weights in the access weight DB 106. Sometimes an access weight to a combination of the item ID and user ID under which an access weight is calculated by the preference extracting engine 104 is already stored in the access weight DB 106. In this case, the preference extracting engine 104 integrates a newly calculated access weight and an access weight already stored in the access weight DB 106 and overwrites an old stored value with that integrated value. The old stored value may be overwritten with a larger access weight.

Next, one item is selected from, all items included in the analysis range of the operation log by the relation extracting engine 108 and processings of steps S106 to S122 (or S124) are carried out about this item (hereinafter referred to as an appropriate item) (start of repetitive processing (A)). First, all users which accessed the appropriate item previously are detected by the relation extracting engine 108 (S106).

Next, one user is selected from all the users which accessed the appropriate item by the relation extracting engine 108, a following processing is carried out for this user (hereinafter referred to as a appropriate user) (start of repetitive processing (B)). First, the access weights of all the items accessed by the appropriate user previously are acquired by the relation extracting engine 108 and the access weight of each item is integrated (S108). Next, only other user is selected from all the users who accessed the appropriate item and then the processing of step S108 is executed again (continuation of repetitive processing (B)). If the processing of step S108 is executed for all users who accessed the appropriate item previously, the repetitive processing is terminated (termination of repetitive processing (B)).

After the repetitive processing (B) ends, the integrated value which is integrated for each item is normalized by the relation extracting engine 108 and the normalized integrated value is set in the degree of relation of the appropriate item (S110). Next, the relation extracting engine 108 sets up the item whose degree of relation is set up is set up in the related item of the appropriate item (S112).

After the related item is set up, an item is selected from items having the degree of relation with the appropriate item by the relation extracting engine 108 and a following processing is executed for this item (hereinafter referred to as the appropriate related item) (startup of repetitive processing (C)). First, whether or not the appropriate related item is an item in a validity period is verified by the relation extracting engine 108 (S114). Then, whether or not the appropriate related item is valid is determined by the relation extracting engine 108 (S116). If the appropriate related item is valid, one of the different appropriate related items is selected and the processings of steps S114 to S116 are executed again (continuation of repetitive processing (C)). If the validity period is determined for all the related items, the procedure proceeds to processing of step S120 (termination of repetitive processing (C)).

On the other hand, if the appropriate related item is invalid, the procedure proceeds to the processing of step S118. In step S118, the invalid related item is removed from a related item group of the appropriate item by the relation extracting engine 108 (S118). Then, one of the different appropriate related items is selected and the processings of the steps S114 to S116 are executed again (continuation of repetitive processing (C)). However, if the validity period is determined for all the related items, the procedure proceeds to the processing of step S120 (termination of repetitive processing (C)).

In step S120, the related items are sorted in descending order (in ascending order) in terms of the degree of the relation by the relation extracting engine 108 and applied as the related item of the appropriate item (S120). The application of the related item mentioned here means a registration of records to the related item meta DB 110. In the meantime, if the quantity of the related items to be registered in the related item meta DB 110 is lower than a predetermined quantity, all the related items are registered in the related item meta DB 110 by the relation extracting engine 108.

The recommendation engine 112 determines whether or not the quantity of the related items registered in the related item meta DB 110 has reached a predetermined quantity (specified quantity) (S122). If the quantity of the related items is equal to or smaller than the specified quantity, the procedure proceeds to the processing of step S124 described below (rescue procedure). On the other hand, if the quantity of the related items is larger than the specified quantity, one of the different appropriate items is selected and the processing since step S106 is executed again (continuation of repetitive processing (A)). However, if the processings of steps S106 to S122 (or S124) are executed for all the items included in the analysis range of the operation log, a series of the processing is terminated (termination of repetitive processing (A)).

(Rescue Procedure)

Figure 7:
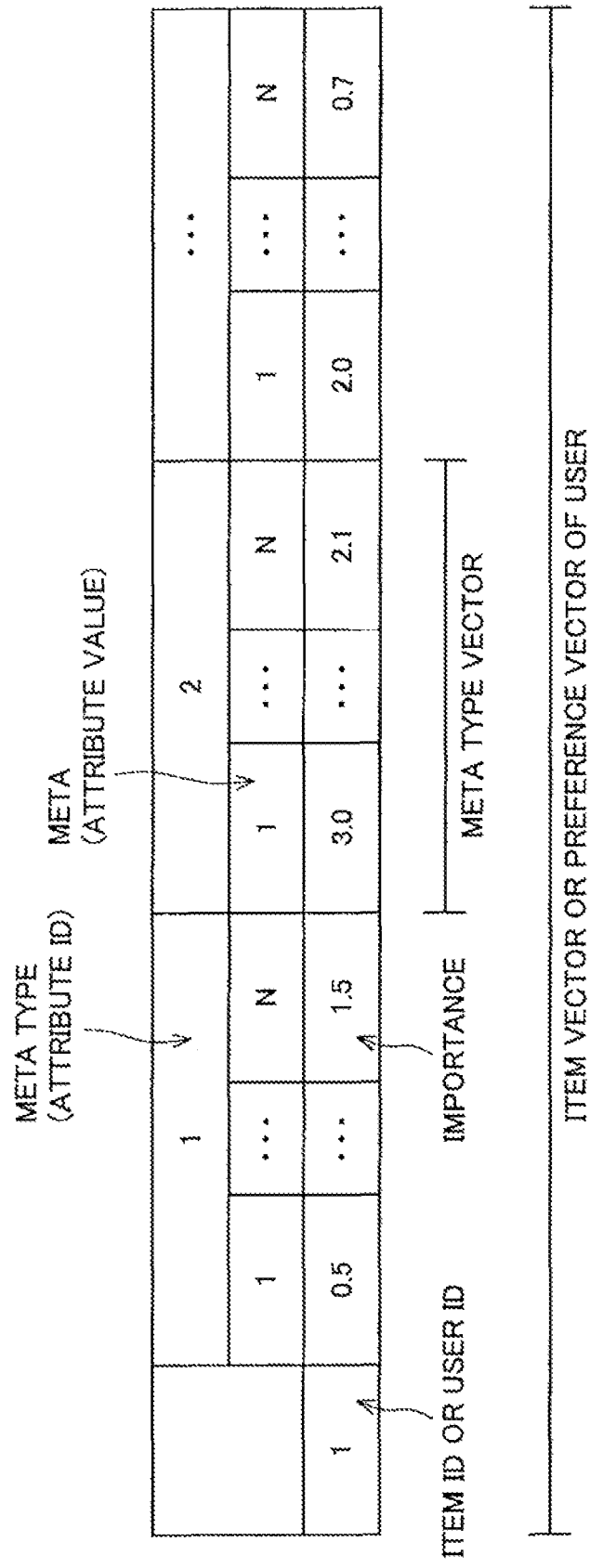
FIG. 7 is an explanatory diagram showing a configuration example of an item vector and user preference vector according to the embodiment.

Here, the rescue procedure of step S124 will be described in detail with reference to FIG. 8. Prior to detailed description of the rescue procedure, an expression style of item information vector for expressing the item information of each item simply will be described with reference to FIG. 7. In the meantime, the expression style of the item information vector will be explained here because it is useful for expressing the preference information of user as described later. FIG. 7 is an explanatory diagram showing the expression style of an item information vector and user preference vector according to this embodiment.

See FIG. 7. As shown in FIG. 7, information of each item is expressed in the form of a vector. If an item ID is contained in the first element (leftmost column), that vector expresses an item information vector. On the other hand, if a user ID is contained in the first element, that vector expresses the user preference vector. Here, the item information vector will be described by taking an example.

In the item information vector, for example, each of plural metas is matched with each meta type and the importance value is applied to each meta. In the meantime, the vector indicating the importance value of each meta as seen in the meta type unit may be sometimes called meta type vector in a following description. Referring to an example (FIG. 5) of the item information DB 114, evidently, the relation among the item ID, meta type, meta and importance value which constitute the item information vector is described in the item information DB 114. That is, the rescue procedure engine 116 can constitute the item information vector based on information of the item information DB 114.

Next, the rescue procedure will be described. The processing of this rescue procedure (step S124) is executed by mainly the rescue procedure engine 116. FIG. 8 is an explanatory diagram showing a flow of rescue procedure of this embodiment.

Figure 8:
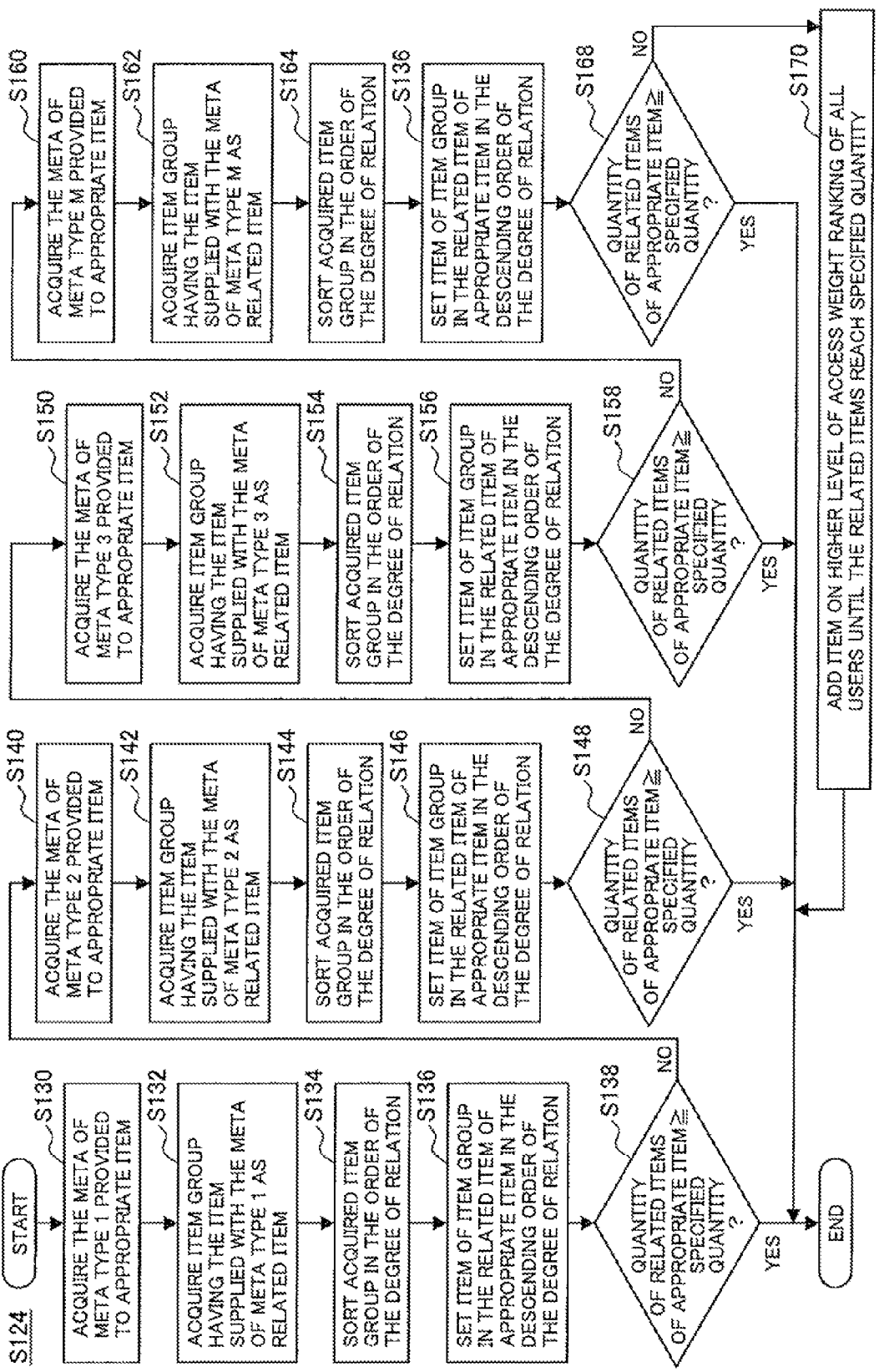
FIG. 8 is an explanatory diagram showing a flow of the related item providing method according to the embodiment.

First, see FIG. 8. If the rescue procedure is started, as shown in FIG. 8, a meta of the meta type 1 applied to the appropriate item is acquired from the item information DB 114 by the rescue procedure engine 116 (S130). For example, consider a case where the appropriate item is an item with item ID of 1005. If the item information DB 114 shown in FIG. 5 is presumed, the meta of the meta type 1 applied to the appropriate item is 153144.

Next, the rescue procedure engine 116 acquires an item group which the item supplied with the meta of the meta type 1 has as the related item (S132). Referring to the item information DB 114 of FIG. 5, the item supplied with the meta (153144) of the meta type 1 is an item with item ID of 1001, 1002, . . . 1014.

In this case, the rescue procedure engine 116 acquires an item having item ID of 1001, 1002, . . . 1014 as the related item. For example, if the item having the item with item ID of 1003 as the related item is retrieved from the related item meta DB 110 (FIG. 4), the items with item ID of 1001, 1011 are extracted. Then, the rescue procedure engine 116 adds the items with item ID of 1001, 1011 to the item group. Likewise, items having an item with other item ID as the related item are extracted and added to the item group.

Next, the rescue procedure engine 116 sorts the item group acquired in step S134 in the order of the degree of relation by referring to the related item meta DB 110 (S134). For example, an item (item ID of 1001, 1011) having item ID of 1003 as a related item is considered as an item contained in the item group. In this case, the rescue procedure engine 116 positions the item with item ID of 1011 having a higher degree of relation (degree of relation: 5.4) at a higher level and an item with item ID of 1001 (degree of relation: 3.4) at a lower level. Other items contained in the item group are also sorted in the order of the degree of relation.

Next, the rescue procedure engine 116 extracts items in the descending order of the degree of relation from, the item, group sorted in step S136 and sets up as a related item of the appropriate item (S136). In case of the related item meta DB 110 exemplified in FIG. 4, the related items set as items with item ID of 1005 are three items with item ID of 1001, 1004 and 1010. If a specification number of the related items is 5, the rescue procedure engine 116 sets up additional two related items. At this time, the rescue procedure engine 116 extracts item ID of 1003 and 1011 having a high degree of relation from the item group (item ID of 1001, 1002, . . . 1011) and sets up as the related item with item ID of 1005.

Next, the rescue procedure engine 116 determines whether or not the quantity of the related items of the appropriate item, exceeds a specified quantity (S138). If the quantity of the related items of the appropriate item is equal to or larger than the specified quantity, the rescue procedure engine 116 terminates a series of processing concerning the rescue procedure. On the other hand, if the quantity of the related items of the appropriate item is smaller than the specified quantity, the rescue procedure engine 116 proceeds to the processing of step S140.

In step S140, the rescue procedure engine 116 acquires the meta of the meta type 2 applied to the appropriate item (S140). Next, the rescue procedure engine 116 acquires an item group having an item supplied with the meta type 2 as the related item (S142). Next, the rescue procedure engine 116 sorts the item group acquired in step S142 in the order of the degree of relation (S144). Next, the rescue procedure engine 116 extracts items in the descending order of the degree of relation from items included in the item group and sets up in the related item of the appropriate item (S146).

Next, the rescue procedure engine 116 determines whether or not the quantity of the related items of the appropriate item exceeds a specified quantity (S148). If the quantity of the related items of the appropriate item is equal to or larger than the specified quantity, the rescue procedure engine 116 terminates a series of the processing concerning the rescue procedure. On the other hand, if the quantity of the related items of the appropriate item is smaller than the specified quantity, the rescue procedure engine 116 proceeds to the processing of step S150.

In step S150, the rescue procedure engine 116 acquires a meta of meta type 3 provided to the appropriate item (S150). Next, the rescue procedure engine 116 acquires an item group having an item supplied with the meta type 3 as a related item (S152). Next, the rescue procedure engine 116 sorts the item group acquired in step S152 in the order of the degree of relation (S154). The rescue procedure engine 116 extracts items in the descending order of the degree of relation from items included in the item group and sets as the related item of the appropriate item (S156).

Next, the rescue procedure engine 116 determines whether or not the quantity of the related items of the appropriate item exceeds a specified quantity (S158). If the quantity of the related items of the appropriate item is equal to or larger than a specified quantity, the rescue procedure engine 116 terminates a series of processing concerned with the rescue procedure. On the other hand, if the quantity of the related items of the appropriate item is smaller than the specified quantity, the rescue procedure engine 116 proceeds to the processing of step S160. However, the same processing as steps S150 to S156 is carried out about meta type 4 to M−1 (M is a natural number) during a proceeding to the processing of step S160.

In step S160, the rescue procedure engine 116 acquires the meta of the meta type M provided to the appropriate item (S160). Next, the rescue procedure engine 116 acquires an item group having an item supplied with the meta type M as the related item (S162). Next, the rescue procedure engine 116 sorts the item group acquired in step S162 in the order of the degree of relation (S164). Next, the rescue procedure engine 116 extracts items in the descending order of the degree of relation from items included in the item group and sets up as the related item of the appropriate item (S166).

Next, the rescue procedure engine 116 determines whether or not the quantity of the related items of the appropriate item exceeds the specified quantity (S168). If the quantity of the related items of the appropriate item is equal to or larger than the specified quantity, the rescue procedure engine 116 terminates a series of processing concerning the rescue procedure. On the other hand, if the quantity of the related items of the appropriate item is smaller than the specified quantity, the rescue procedure engine 116 proceeds to the processing of step S170. In step S170, the access weight DB 106 is referred to by the rescue procedure engine 116 and an item on a high level of the access weight ranking of all users is set up as a related item of the appropriate item (S170). At this time, the rescue procedure engine 116 sets up the related items so that the quantity of the related items of the appropriate item is of a specified quantity and after that, terminates a series of processing concerning the rescue procedure.

(Conceptual Explanation)

Figure 9:
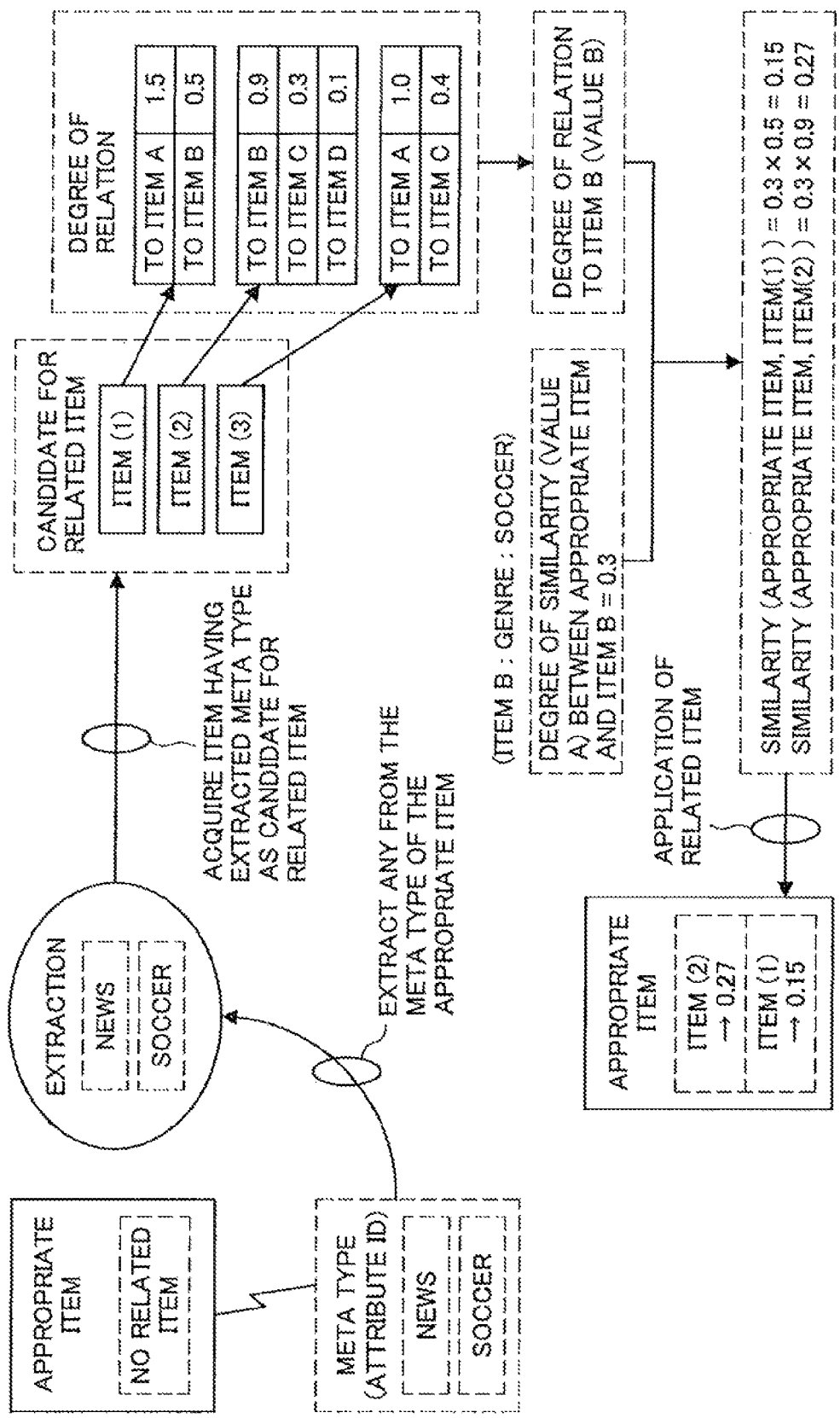
FIG. 9 is an explanatory diagram showing a calculation method for the degree of similarity of the related item according to the embodiment.

Here, the conceptual explanation of the above-described rescue procedure will be made with reference to the conceptual diagram, of FIG. 9. FIG. 9 is an explanatory diagram showing the concept of the rescue procedure of this embodiment briefly. In this rescue procedure (version for social related usage), the similarity of the item is not calculated using the relation of the meta but the similarity of the item is calculated based on social knowledge within a community. Thus, the degree of similarity not expressed in the meta can be considered. This degree of similarity is a value calculated based on the relation of the meta.

A case where no related item exists in the appropriate item as shown in FIG. 9 will be considered. It is assumed that "News" and "Soccer" are provided to the appropriate item as a meta type. However, the appropriate item is supplied with an ID (attribute ID) of a meta type corresponding to "News" and "Soccer" actually.

First, any meta of the meta type possessed by the appropriate item is extracted by the rescue procedure engine 116. It is assumed that the meta (attribute value) corresponding to "News" and "Soccer" has been extracted. Next, the rescue procedure engine 116 acquires an item having the extracted meta as a candidate for the related item (hereinafter referred to as a related item candidate). Assume that an item (1), an item (2) and an item (3) are acquired as the related item candidates.

These items are supplied with the degree of relation. For example, assume that the item (1) is supplied with a degree of relation 1.5 to the item A and 0.5 to the item B. Further, assume that the item (2) is supplied with a degree of relation 0.9 to the item B, a degree of relation 0.3 to the item C, and a degree of relation 0.1 to the item D. Assume that the item (3) is supplied with a degree of relation 1.0 to the item A and a degree of relation 0.4 to the item C. Further, assume that the item B has the same meta (for example, "Soccer") as the meta extracted from the meta of the appropriate item.

In this case, the rescue procedure engine 116 calculates the degree of relation between the appropriate item and each related item candidate based on the degree of relation (value B) of each related item candidate to the item B and the degree of similarity (value A) between the appropriate item and the item B. For example, this degree of relation can be calculated based on an expression (1) and an expression (2) mentioned below.

[Formula 1]

$$\text{Degree of relation (appropriate item, item (1))} = \quad (1)$$
$$(\text{value } A) \times (\text{value } B) = 0.3 \times 0.5 = 0.15$$

$$\text{Degree of relation (appropriate item, item (2))} = \quad (2)$$
$$(\text{value } A) \times (\text{value } B) = 0.3 \times 0.9 = 0.27$$

The degree of relation calculated by the aforementioned expressions (1) and (2) is set to the degree of relation when each related item candidate is provided to the appropriate item as the related item. For example, the item (1) having the degree of relation 0.15 and the item (2) having the degree of relation 0.27 are provided to the appropriate item. The related item to be provided to the appropriate item and the degree of relation to be set in each related item are calculated in this way. Although the method using an integrated value of the (value A) and the (value B) has been indicated in the above-described example, it is permissible to use a method using an additional value of the (value A) and the (value B) or just the (value B) as it is.

In the above description, the method for selecting an item having the same meta as a meta extracted from the meta group of the appropriate item has been described as a selection method for the related item candidate. This method will be described more in detail.

As the rescue procedure of this embodiment, various selection methods for the related item candidate can be applied. For example, a method in which the degree of preference is set in each meta in advance and then an item having a meta with a high degree of preference is selected as a related item candidate (method 1) can be applied. Further, it is permissible to apply another method in which the meta group of the appropriate item is expressed with a meta type vector (see FIG. 7) and an item having a high degree of similarity in terms of the meta type vector is selected as the related item candidate (method 2).

Hereinafter, the aforementioned method 2 will be described briefly. The method 2 compares the degrees of similarity calculated using the meta type vector between different items. This degree of similarity is calculated according to an expression (3) below. The calculation method for the degree of similarity used here does not need to be of inner product mentioned below but may be any method by calculating a cosine scale or Euclidean distance.

[Formula 2]

$$\text{Degree of similarity } (X, Y) = |X \cdot Y| \tag{3}$$

where:
X: meta type vector based on the meta group of an appropriate item
Y: meta type vector based on the meta group of a calculation target item According to the aforementioned method 2, the degrees of similarity calculated by the expression (3) are compared about each calculation target item and then, upper N items (N is a predetermined quantity) are selected in the descending order in terms of the degree of similarity as a related item candidate.

Modification Example 1-1

Figure 10:
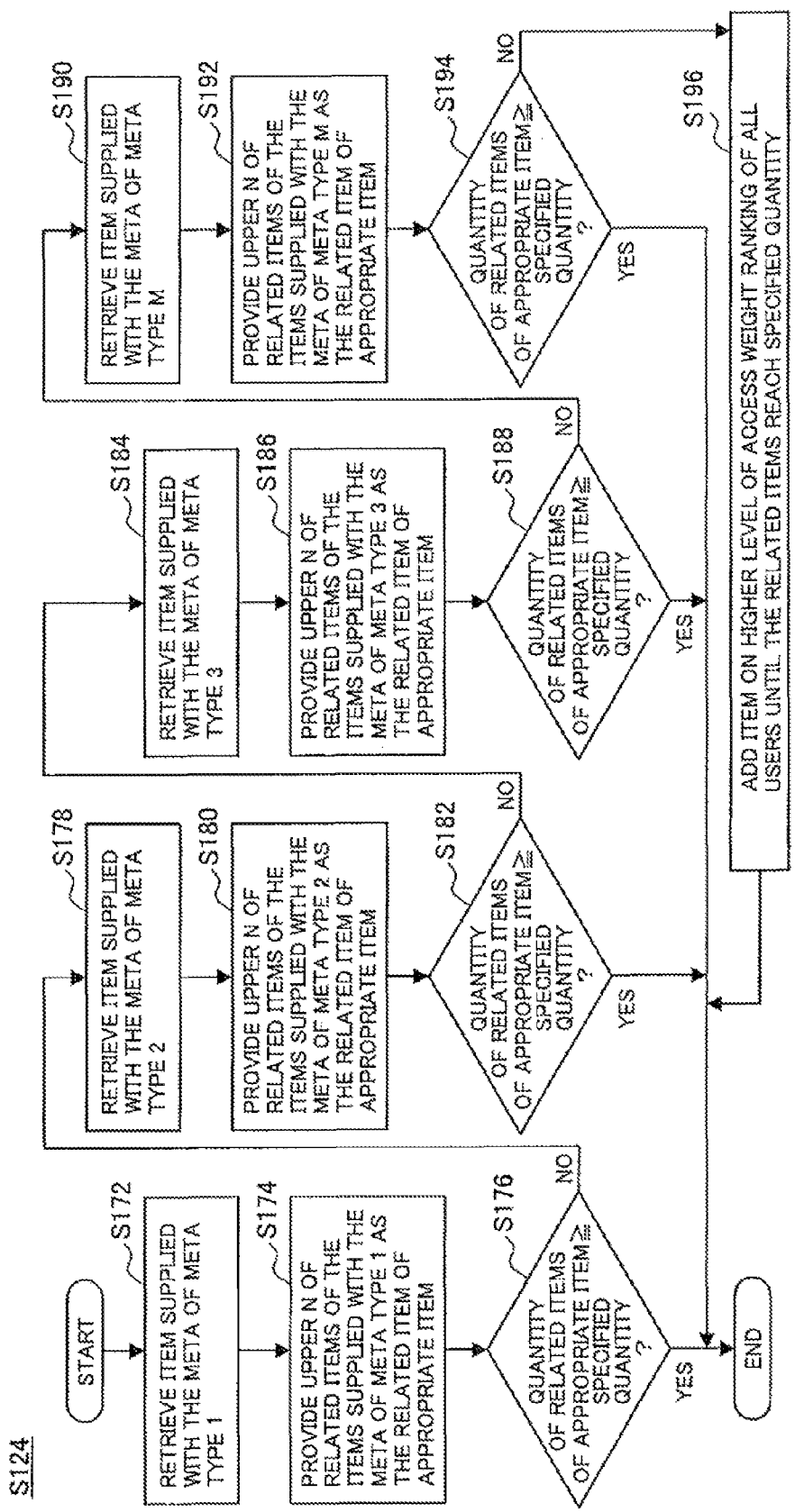
FIG. 10 is an explanatory diagram showing a flow of the related item providing method according to the embodiment.

Here, the modification example (modification example 1-1) of the rescue procedure of this embodiment will be described. According to the above-described rescue procedure, a related item candidate is extracted based on the meta of an appropriate item and the related item of the appropriate item is set up based on the degree of relation of the related item possessed by the related item candidate or the like. For example, a method in which an item having a meta similar to the meta of the appropriate item is extracted and the related item of that item is set to the related item of the appropriate item can be considered using this concept. Then, this method will be described below with reference to FIG. 10. FIG. 10 is an explanatory diagram showing a flow of the rescue procedure according to the modification example 1-1 of this embodiment.

As shown in FIG. 10, first, the rescue procedure engine 116 retrieves an item supplied with the meta type 1 (S172). As for the items supplied with the meta of the meta type 1, the rescue procedure engine 116 extracts upper N items (N is a predetermined quantity) in the descending order in terms of the degree of relation from the related items possessed by each item. Then, the rescue procedure engine 116 sets up the extracted item in the related item of the appropriate item (S174).

Next, the rescue procedure engine 116 determines whether or not the quantity of the related items of an appropriate item exceeds a specified quantity (S176). If the quantity of the related items of the appropriate item is equal to or larger than the specified quantity, the rescue procedure engine 116 terminates a series of processings concerning the rescue procedure. On other hand, if the quantity of the related items of the appropriate item is smaller than the specified quantity, the rescue procedure engine 116 proceeds to the processing of step S178.

In step S178, an item supplied with the meta type 2 is retrieved, by the rescue procedure engine 116 (S178). Next, the rescue procedure engine 116 extracts upper N items (N is a predetermined quantity) in the descending order in terms of the degree of relation from the related items possessed by each item, for the item supplied with the meta of the meta type 2. Then, the rescue procedure engine 116 sets the extracted item as the related item of the appropriate item (S180).

Next, the rescue procedure engine 116 determines whether or not the quantity of the related items of the appropriate item exceeds the specified quantity (S182). If the quantity of the related items of the appropriate item is equal to or larger than the specified quantity, the rescue procedure engine 116 terminates a series of processing concerning the rescue procedure. On the other hand, if the quantity of the related items of the appropriate item is smaller than the specified quantity, the rescue procedure engine 116 proceeds to the processing of step S184.

In step S184, an item supplied with the meta type 3 is retrieved by the rescue procedure engine 116 (S184). Next, the rescue procedure engine 116 extracts upper N items (N is a predetermined quantity) in the descending order in terms of the degree of relation from the related items possessed by each item for the item, supplied, with the meta of the meta type 3. Then, the rescue procedure engine 116 sets up the extracted item as the related item of the appropriate item (S186).

Next, the rescue procedure engine 116 determines whether or not the quantity of the related items of the appropriate item, exceeds the specified quantity (S188). If the quantity of the related items of the appropriate item is equal to or larger than the specified quantity, the rescue procedure engine 116 terminates a series of processings concerning the rescue procedure. On the other hand, if the quantity of the related items of the appropriate item is smaller than the specified quantity, the rescue procedure engine 116 proceeds to the processing of step S190. However, during a proceeding of the processing of step S190, the same processing is carried out for the meta type 4 to M−1 (M is a natural number) as steps S184 to S188.

In step S190, an item supplied with the meta type M is retrieved by the rescue procedure engine 116 (S190). Next, the rescuer procedure engine 116 extracts upper N items (N is a predetermined quantity) in the descending order in terms of the degree of relation from the related items possessed by each item for the item supplied with the meta of the meta type M. Then, the rescue procedure engine 116 sets up the extracted item in the related item of the appropriate item (S192).

Next, the rescue procedure engine 116 determines whether or not the quantity of the related items of the appropriate item exceeds the specified quantity (S194). If the quantity of the related items of the appropriate item is equal to or larger than the specified quantity, the rescue procedure engine 116 terminates a series of processings concerning the rescue procedure. On the other hand, if the quantity of the related items of the appropriate item is smaller than the specified quantity, the rescue procedure engine 116 proceeds to the processing of step S196. In step S196, the rescue procedure engine 116 refers to the access weight DB 106 and sets up items on a high level of the access weight ranking of all users as the related items of the appropriate item (S196). At this time, the rescue procedure engine 116 sets up the related items so that, the quantity of the related items of the appropriate item is of the specified quantity and after that, terminates a series of processings concerning the rescue procedure.

(Conceptual Explanation)

Figure 11:
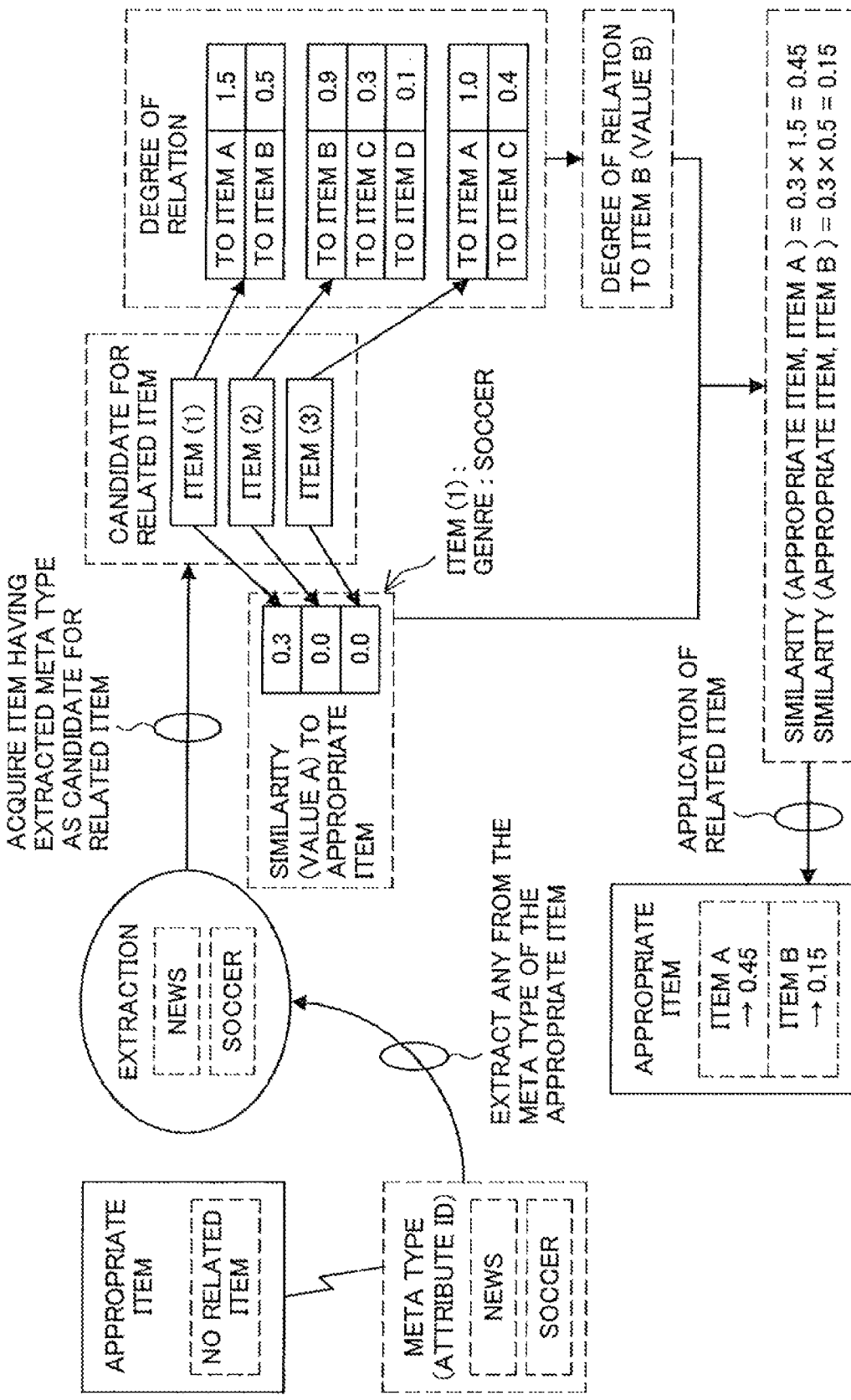
FIG. 11 is an explanatory diagram showing a calculation method for the degree of similarity of the related item according to the embodiment.

Here, the conceptual description of the rescue procedure of the modification example 1-1 will be made with reference to the conceptual diagram of FIG. 11. FIG. 11 is an explanatory diagram showing the concept of the rescue procedure of the modification example 1-1.

Consider a case where no related item, exists in the appropriate item as shown in FIG. 11. Assume that the appropriate item is supplied with "News" and "Soccer" as the meta type. However, the meta type ID (attribute ID) corresponding to the "News" and "Soccer" is provided to the appropriate item actually.

First, any meta of the meta type of an appropriate item is extracted by the rescue procedure engine 116. Assume that a meta (attribute value) corresponding to "News" and "Soccer" has been extracted. Next, the rescue procedure engine 116 acquires an item having the extracted meta as a candidate for the related item, (hereinafter referred to as related item candidate). Then, assume that an item (1), an item (2) and an item (3) are acquired as the related item candidate.

These items are supplied with the degree of relation. For example, assume that the item (1) is supplied with a degree of relation 1.5 to an item A and a degree of relation 0.5 to an item B. Further, assume that the item (2) is supplied with a degree of relation 0.9 to the item B, a degree of relation 0.3 to an item C, and a degree of relation 0.1 to an item D. Assume that the item (3) is supplied with a degree of relation 1.0 to the item A and a degree of relation 0.4 to the item C.

Further, assume that, a degree of similarity (value A) of the related item candidate to the appropriate item is calculated by the rescue procedure engine 116. In the example of FIG. 11, the degree of similarity between the item (1) and the appropriate item is 0.3, the degree of similarity between the item (2) and the appropriate item is 0.0 and the degree of similarity between the item (3) and the appropriate item is 0.0. This example corresponds to a case where the same meta (for example, "soccer") as the appropriate item is contained, in the meta of the item (1).

In this case, the rescue procedure engine 116 calculates the degree of similarity between an appropriate item and a related item of each related item candidate based on the degree of similarity (value A) between the appropriate item and each related item candidate and the degree of relation (value B) of each related item candidate with respect to each related item. This degree of similarity can be calculated based on, for example, an expression (4) and an expression (5) below. Then, a predetermined quantity of the related items is provided to the appropriate item in the descending order in terms of the degree of the calculated similarity. In the meantime, because the degree of similarity between the item (2)/the item (3) and the related item is 0.0, the description of the degree of similarity between these items is omitted.

[Formula 3]

$$\text{Degree of similarity (appropriate item, item } A) = \quad (4)$$
$$(\text{value } A) \times (\text{value } B) = 0.3 \times 1.5 = 0.45$$

$$\text{Degree of similarity (appropriate item, item } B) = \quad (5)$$
$$(\text{value } A) \times (\text{value } B) = 0.3 \times 0.5 = 0.15$$

The degree of similarity calculated by the expressions (4) and expression (5) is set to the degree of relation when the related item of each related item candidate is provided to the appropriate item. For example, the item A having the degree of relation 0.45 and the item B having the degree of relation 0.15 are provided to the appropriate item. In this way, the related item to be provided to the appropriate item and the degree of relation to be set in each related item are calculated. In the meantime, although the above-described example indicates a method using an integrated value of the (value A) and the (value B), it is permissible to apply a method using an additional value of the (value A) and the (value B) or just the (value B) as it is.

In the above description, a method for selecting an item having the same meta as a meta extracted from the meta group of the appropriate item has been described as a selection method for the related item candidate. This method will be described more in detail.

The rescue procedure of this embodiment can adopt various selection methods for the related item candidate. For example, it is permissible to adopt a method in which the degree of preference of each meta is set tip preliminarily and an item having a meta with high degree of preference is selected as a related item candidate (method 1). Further, it is permissible to adopt another method in which the meta group of an appropriate item is expressed with a meta type vector (see FIG. 7) and an item having a high, degree of similarity in terms of the meta type vector is selected as a related item candidate (method 2).

Hereinafter, the aforementioned method 2 will be described briefly. The method 2 compares the degrees of similarity calculated using the meta type vector between items. This degree of similarity is calculated according to an expression (6) below. However, the calculation method for the degree of similarity used here does not need to be of inner product mentioned below, but may be any method for calculating a cosine scale or Euclidean distance.

[Formula 4]

$$\text{Degree of similarity } (X, Y) = |X \cdot Y| \quad (6)$$

where:

X: meta type vector based on the meta group of an appropriate item

Y: meta type vector based on the meta group of a calculation target item

According to the aforementioned method 2, the degrees of similarity calculated with the expression (6) are compared about each calculation target item and then, upper N items (N is a predetermined quantity) are selected in the descending order in terms of the degree of similarity as the related item candidate.

Second Embodiment

Next, the second embodiment of the present invention will be described. This embodiment concerns a related item calculation method which enables the result by the collaborative filtering (CF) to be calculated together within the frame of the content based filtering (CBF). Particularly, this embodiment concerns an art for calculating the related item using the preference information of user.

[Configuration Example of Related Item Providing System 200]

Figure 12:
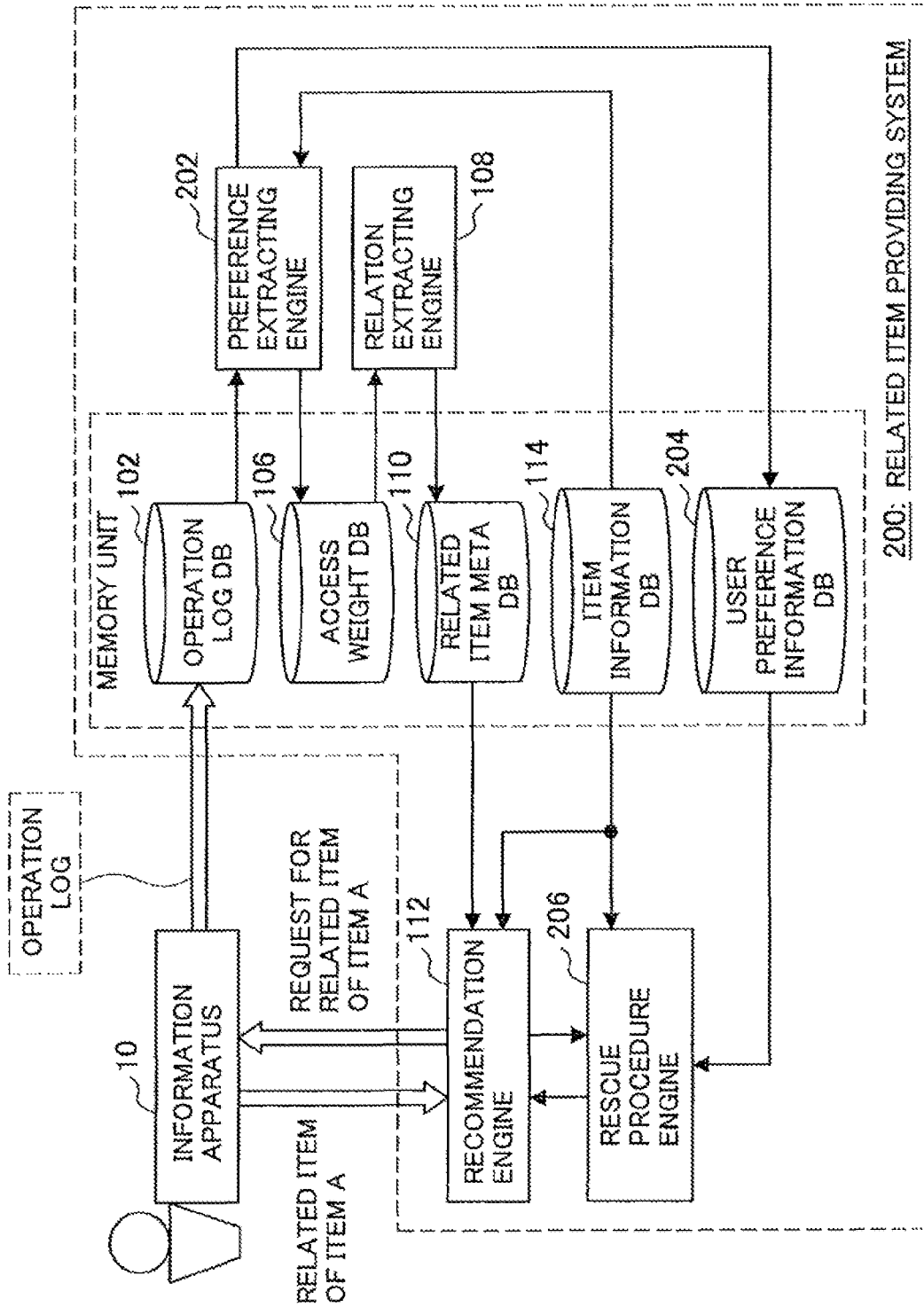
FIG. 12 is an explanatory diagram showing a system configuration of a related item providing system according to a second embodiment of the present invention.

First, the system configuration of the related item providing system 200 of this embodiment will be described by referring to FIG. 12. FIG. 12 is an explanatory diagram showing a configuration example of the related item providing system 200 of this embodiment. In the meantime, like reference numerals are attached to substantially the same functional configurations as the related item providing system 100 of the first embodiment and thus, a detailed description thereof is not repeated here.

As shown in FIG. 12, the related item providing system 200 includes mainly, an operation log DB 102, a preference extracting engine 202, an access weight DB 106, a relation extracting engine 108, a related item meta DB 110, a recommendation engine 112, an item information DB 114, a rescue procedure engine 206 and a user preference information DB 204. A main difference of this embodiment from the related item providing system 100 of the first embodiment exists in the preference extracting engine 202, the function of the rescue procedure engine 206 and an existence of the user preference information DB 204. Then, these differences will be described.

The related item providing system 200 is connected to an information apparatus 10 operated by user directly or via a network in order to acquire an operation log of the information apparatus 10 and provide a related item to the information apparatus 10. Although only one information apparatus 10 is represented in FIG. 12 for convenience, two or more may be provided.

In the meantime, the operation log DB 102, the access weight DB 106, the related item meta DB 110, the item information DB 114 and the user preference information DB 204 are stored in a predetermined memory unit. For example, this memory unit corresponds to a RAM 906, a memory section 920 or a removable memory medium 928 or the like in a hardware configuration example described later.

(Preference Extracting Engine 202)

The preference extracting engine 202 acquires a user operation log from the operation log DB 102 to calculate an access weight to each item for each user. The access weight calculated by the preference extracting engine 202 is stored in the access weight DB 106 and the user preference information DB 204. In the meantime, the access weight mentioned here is an index which indicates how a certain user prefers a particular item or information indicating the degree of his or her preference. That is, the access weight is an example of the preference information.

For example, a weight value is set up preliminarily for each operation log and the access weight of each user to each item is calculated based on that value. Here, an example of the calculation method for the access weight will be described briefly. First, the preference extracting engine 202 specifies an accessed item based on each operation log acquired from the operation log DB 102. Next, the preference extracting engine 202 acquires the meta of the specified item and the importance value (weight value) corresponding to that meta toy referring to the access information DB 114. Next, the preference extracting engine 202 integrates the importance value of each meta and stores that integrated value as the access weight. In the meantime, the access weight may be calculated for each meta type.

(User Preference Information DB 204)

The user preference information DB 204 is a database which stores the attribute information calculated as the preference information for each user. The attribute information stored in the user preference information DB 204 is read out by the rescue procedure engine 206.

Here, the configuration example of the user preference information DB 204 will be described with reference to FIG. 13. FIG. 13 is an explanatory diagram (Table 5) showing a configuration example of the user preference information DB 204 of this embodiment. In the example of Table 5, the user preference information DB 204 has columns about user ID (member ID), meta type (attribute ID), meta (value ID; attribute value), and importance value (score). In the meantime, when each item is supplied with a related item, the meta corresponding to each related, item may be stored.

The information to be recorded in the column of the user ID is identification information (ID) for identifying each user. The information to be recorded in the column of the meta type is information indicating the type of the attribute information given to each item. The identification information (ID) indicating, for example, genre, person, keyword, broadcasting time, broadcasting station, title and the like is recorded in this column.

The attribute value of each item is recorded in the column of the meta. For example, the identification information (ID) indicating "Action", "Yamada Taro" and "New Year" is recorded in this column. The information to be recorded in the column of the importance value is information indicating the importance value of a meta recorded in the record. This importance value is calculated based on the appearance frequency of the meta or the like when the metas of all items are referred to (for example, TF-IDF).

(Rescue Procedure Engine 206)

See FIG. 12 again. The rescue procedure engine 206 calculates a related item in a different way from the recommendation engine 112 when it receives a request about the related item from the recommendation engine 112. If the quantity of the related items calculated based on the related item meta DB 110 or the like is lower than a predetermined quantity, the recommendation engine 112 requests the rescue procedure engine 116 for the related item. After receiving this request, the rescue procedure engine 206 provides a predetermined quantity of the related items to the recommendation engine 112 so that the quantity of the related items reaches the predetermined quantity. However, the rescue procedure engine 206 extracts the related items using the user preference information different from the rescue procedure engine 116 of the first embodiment. Hereinafter, this extraction method will be described in detail.

(Detail of Rescue Procedure)

Figure 14:
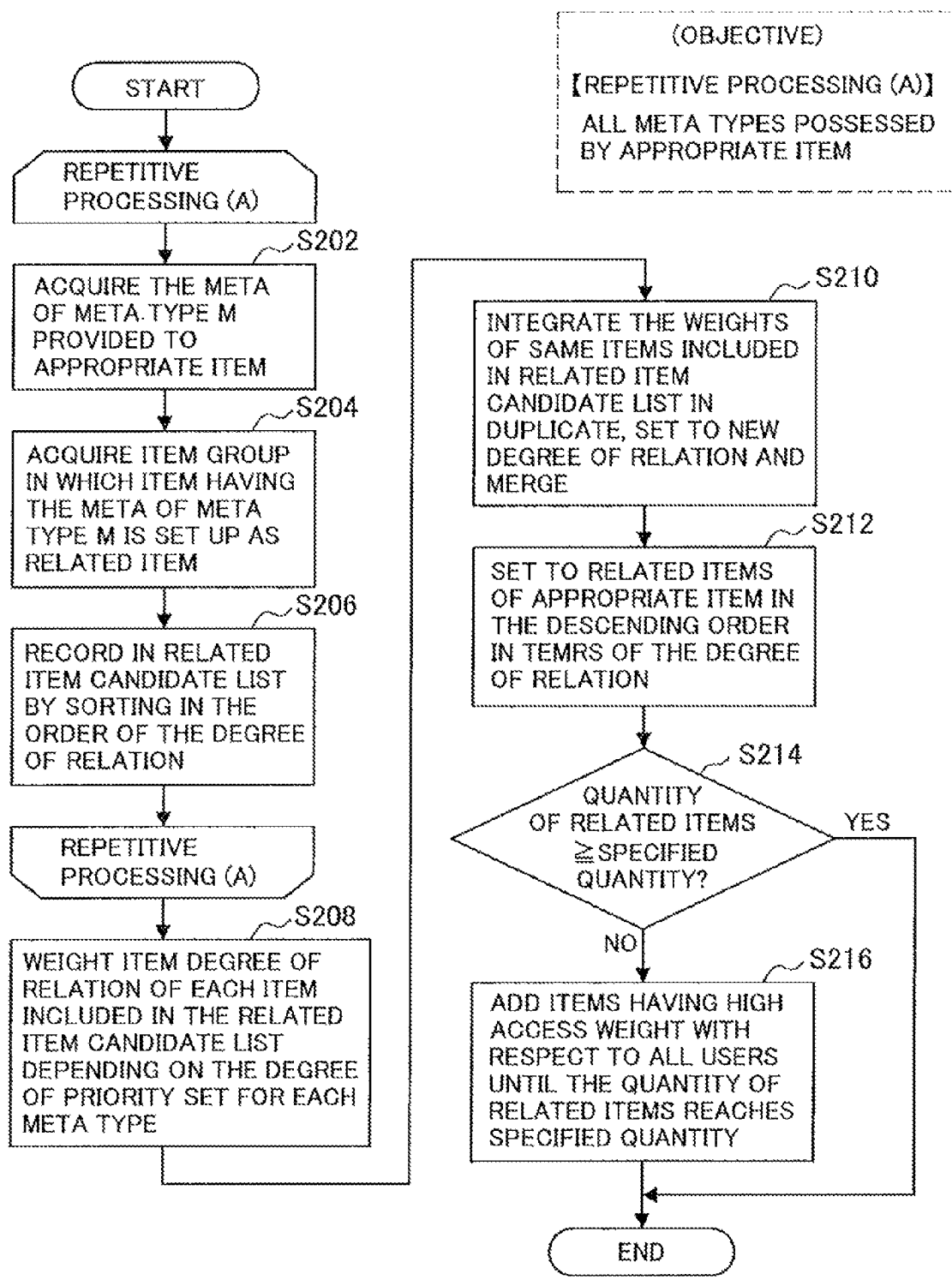
FIG. 14 is an explanatory diagram showing a flow of the related item providing method according to the embodiment.

Here, the rescue procedure of this embodiment will be described with reference to FIG. 14. FIG. 14 is an explanatory diagram showing the flow of the rescue procedure of this embodiment.

The rescue procedure of the first embodiment is carried out based on the degree of priority of preliminarily set meta types (for example, in the order of meta type 1, meta type 2, ... meta type M) and consequently, the related item of an appropriate item is set up. The rescue procedure of this embodiment concerns a method for merging results of processings carried out for all the meta types. This method enables an item having a higher degree of relation to be set up in the related item of the appropriate item without being affected by the degree of relation of any particular meta type. Hereinafter, this method will be described in detail.

First, the rescue procedure engine 206 acquires all meta types possessed by an appropriate item, selects a meta type (hereinafter referred to as an appropriate meta type; meta type M) and executes processings of steps S202 to S206 (start of repetitive processing (A)).

In step S202, the meta of the meta type M given to the appropriate item is acquired by the rescue procedure engine 206 (S202). Next, the rescue procedure engine 206 acquires items (item group) supplied with the item having the meta of the meta type M as a related item (S204). Next, the rescue procedure engine 206 sorts the items in the descending order in terms of the degree of relation by referring to the degree of relation with respect, to each item contained in the item group and records in a list of the related item candidates (S206).

Next, the rescue procedure engine 206 selects other appropriate meta type from the meta types possessed by the appropriate item and executes the processings of step S202 to S206 again. However, if the processings of steps S202 to S206 are executed for all the meta types possessed by the appropriate item, the rescue procedure engine 206 proceeds to the processing of step S208.

In step S208, the rescue procedure engine 206 weights the degree of relation of each item contained in the related item candidate list depending on the degree of priority of each meta type (S208). Although the degree of priority of each meta type may be set up preliminarily, it may be calculated dynamically. The method for calculating dynamically will be described briefly.

As a calculation method for the degree of priority, for example, a method in which the degree of priority is determined depending on the bias of the meta possessed by an appropriate item (method 1) and a method in which the degree of priority is determined depending on the bias of preference of user who makes an access (method 2) are available.
(Method 1)

If the method 1 is applied, the rescue procedure engine 206 calculates the bias of each meta possessed by an appropriate item with respect to each meta type and calculates its weight, depending on that bias. For example, the rescue procedure engine 206 sets up a large weight value to a meta type having a large bias. By this setting, the relation between the meta type having a large weight value and an item supplied with that meta type is regarded as particularly important. As a calculation method for the bias, for example, a following method is available. (1) An average of the weight values is calculated as regards the meta contained in each meta type and the higher the average value, the larger bias value is set up. (2) A bias value is set up depending on the ratio of metas each having a finite value of the metas contained in respective meta types.
(Method 2)

When the method 2 is adopted, the rescue procedure engine 206 calculates the bias value of preference of user who makes an access like the method 1 and calculates its weight value corresponding to that bias value. For example, the weight value of a meta type in which the user preference is biased largely is set large. By this setting, the relation with the meta type which an appropriate user regards as important is regarded as important.

After the above-described weighting, the weight values of items contained in the related item candidate list in duplicate are summed up by the rescue procedure engine 206 and merged as a new degree of relation (S210). That is, if a plurality of records of the same item exist in the related item candidate list, those records are collected in a single record. At that time, the degree of relation to be recorded in that record is set in a sum value of the weight values recorded in plural records about the same item.

Next, the rescue procedure engine 206 extracts upper N items (N is a predetermined quantity) in the descending order in terms of the degree of relation, from items contained in the related item candidate list and sets them as the related item of the appropriate item (S212). Next, the rescue procedure engine 206 determines whether or not the quantity of the related items reaches a specified quantity (S214). If the quantity of the related items is equal to or larger than the specified quantity, the rescue procedure engine 206 terminates a series of processings concerning the rescue procedure. On the other hand, if the quantify of the related items is smaller than the specified quantity, the rescue procedure engine 206 proceeds to the processing of step S216.

In step S216, upper items in the descending order in terms of the access weight to all users are extracted by the rescue procedure engine 206 and provided to the related items of the appropriate item (S216). At this time, items having a higher access weight are added by the rescue procedure engine 206 until the quantity of the related items of the appropriate item reaches the specified quantity. In this way, the related items are added to the appropriate item only by the specified quantity and a series of the processings concerning the rescue procedure is terminated.

The above-described method enables an item, having a higher degree of relation to be calculated as a related item without being affected by the degree of relation using a particular meta type.

Modification Example 2-1

Figure 15:
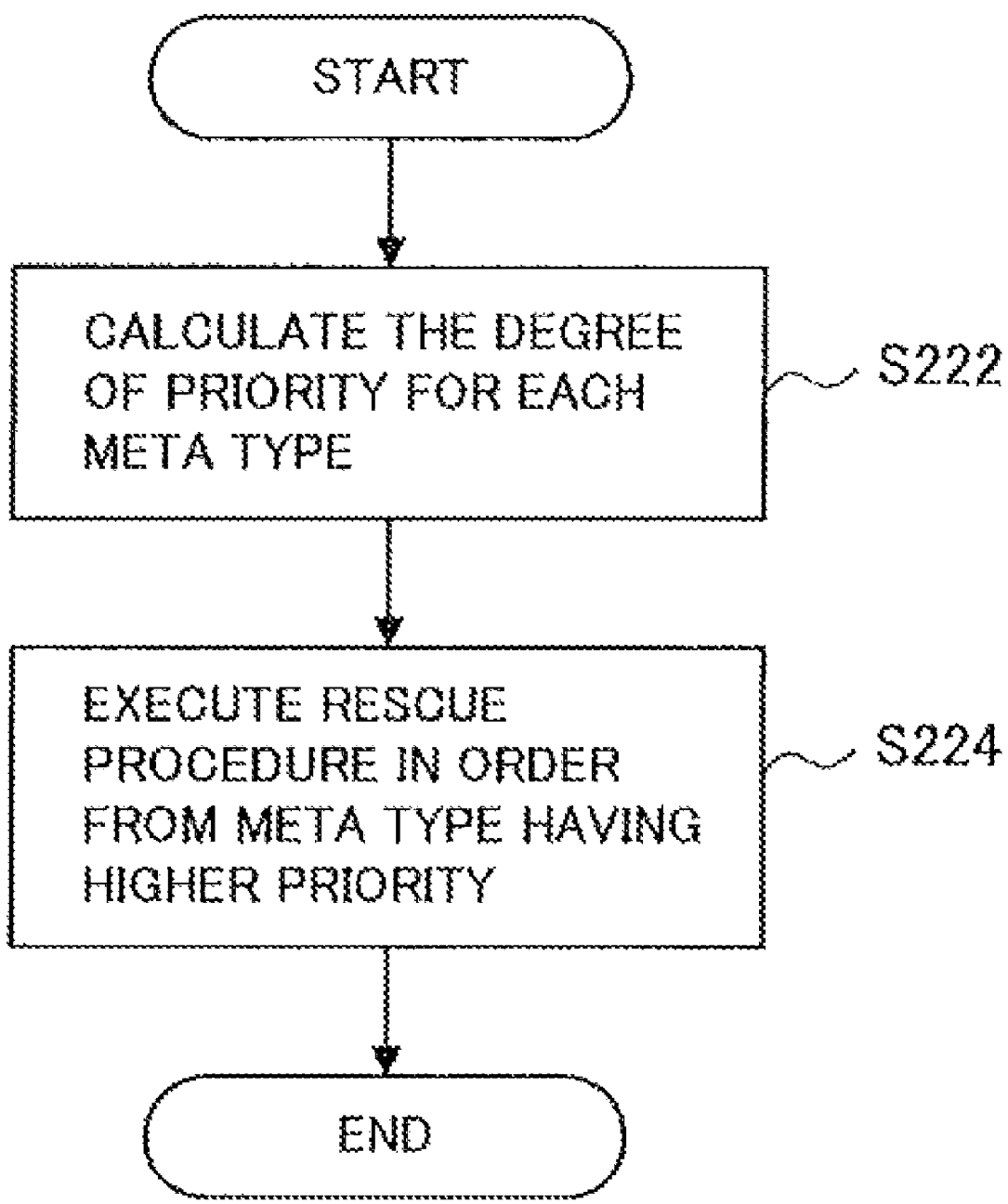
FIG. 15 is an explanatory diagram showing a flow of the related item providing method according to the embodiment.

Here, the modification example (modification example 2-1) of the rescue procedure of this embodiment will be described with reference to FIG. 15. FIG. 15 is an explanatory diagram showing a flow of the rescue procedure of the modification example 2-1. This modification example 2-1 concerns a calculation method for the degree of priority for determining the order of the meta types whose processing is to be executed with a priority. In case of this modification example 2-1, the rescue procedure engine 206 executes the calculation processing for the degree of priority at a stage prior to execution of the rescue procedure.

As shown in FIG. 15, first, the rescue procedure engine 206 calculates the degree of priority for each meta type (S222). At this time, the rescue procedure engine 206 calculates the bias of each meta type for the meta possessed, by each appropriate item and sets the degrees of priority of the meta types in the descending order in terms of the bias size. Next, the rescue procedure engine 206 executes the rescue procedure in order from a meta type having the highest degree of priority (S224).

As described above, a higher degree of priority is set in a meta type having a larger meta bias. Then, the rescue procedure engine 206 can set up upper items as the related items of an appropriate item in the descending order in terms of the degree of priority using this degree of priority. Further, the rescue procedure engine 206 can change the quantity of items to be given as the related items corresponding to the bias size calculated for each meta type. According to this method, an item highly related to the appropriate item is regarded as more important using the meta type having a large bias.

Like the bias of the meta type, the rescue procedure engine 206 may calculate the bias of the preference of user who makes an access and set the degree of priority depending on the calculated user preference bias. In this case, the rescue procedure engine 206 selects items in order from an item having a higher user preference bias and sets them as the related items of an appropriate item. Further, the rescue procedure engine 206 is able to change the quantity of items to be given as the related items corresponding to the user preference bias. That is, according to this method, an item having a higher user preference bias is regarded as more important as an item highly related to the appropriate item.

Modification Example 2-2

Figure 16:
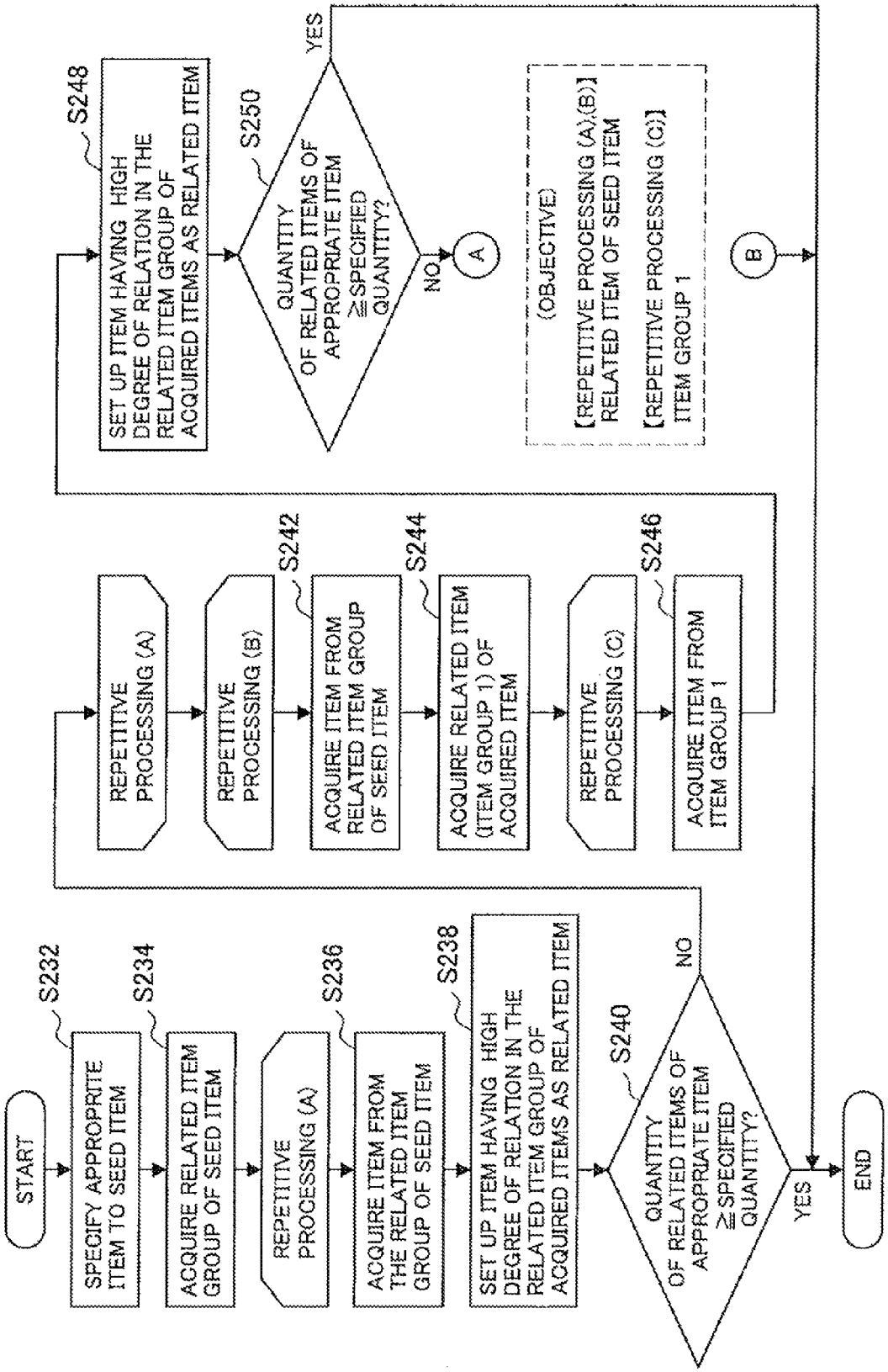
FIG. 16 is an explanatory diagram showing a flow of the related item providing method according to the embodiment.
Figure 17:
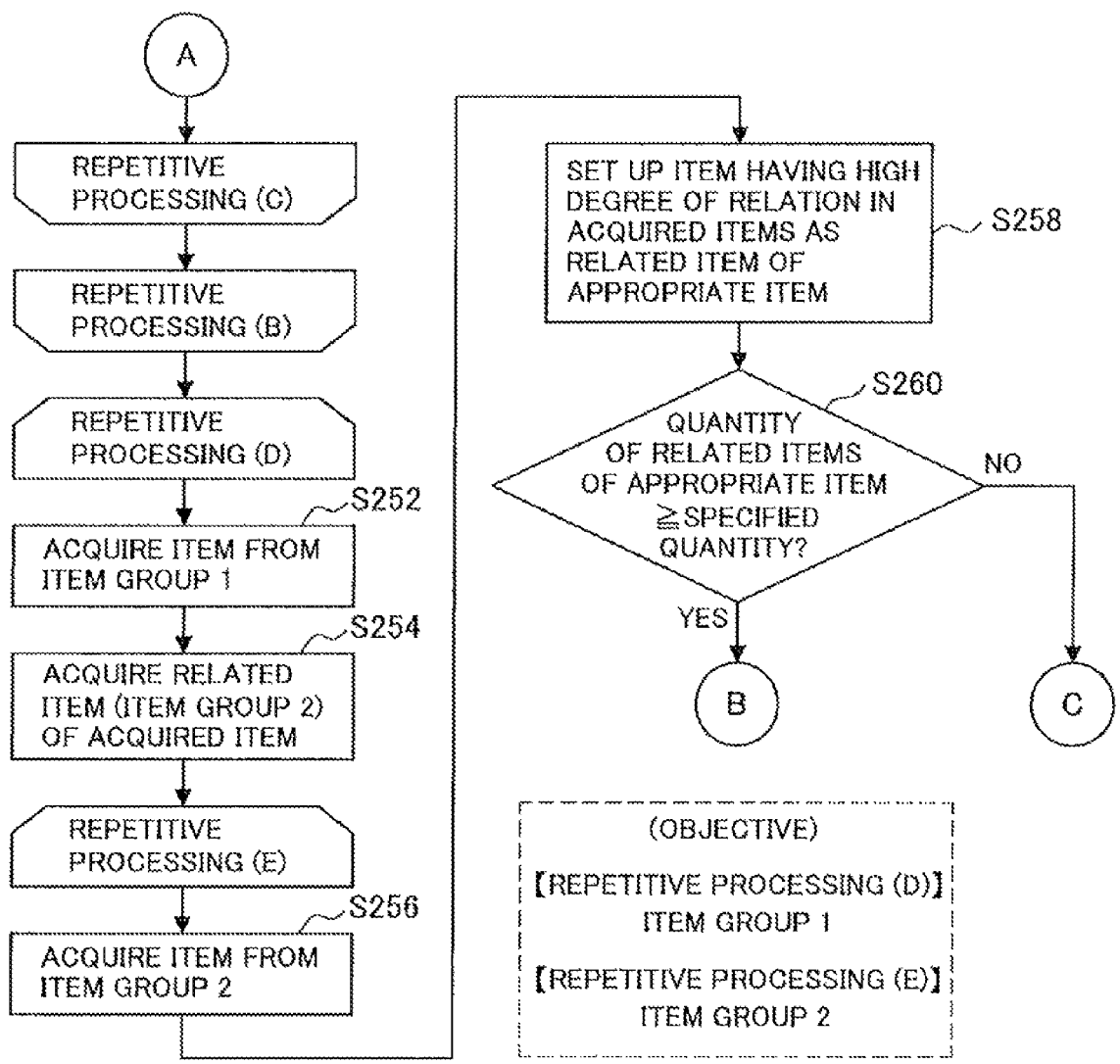
FIG. 17 is an explanatory diagram showing a flow of the related item providing method according to the embodiment.
Figure 18:
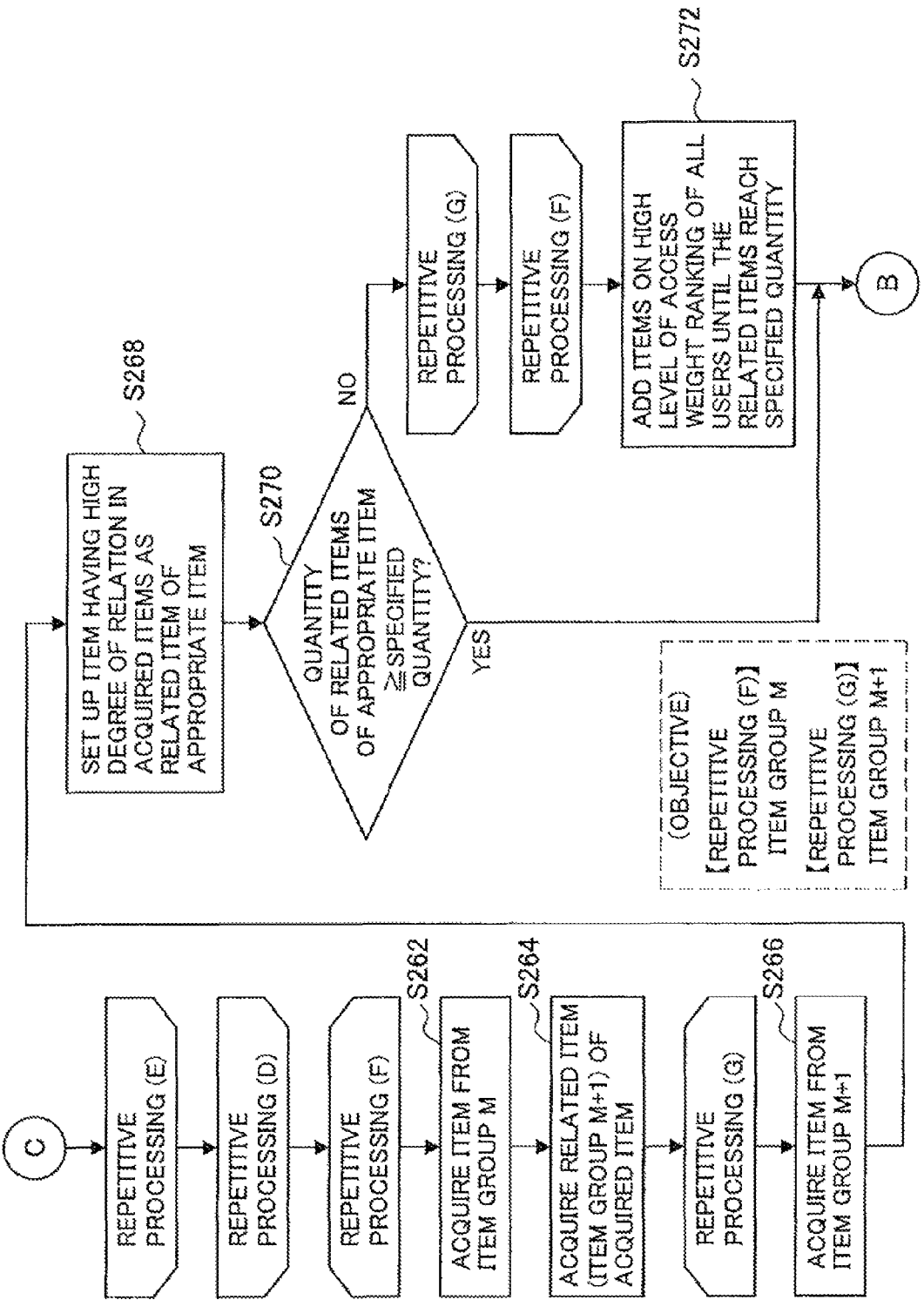
FIG. 18 is an explanatory diagram showing a flow of the related item providing method according to the embodiment.

Next, the modification example (modification example 2-2) of the rescue procedure of this embodiment will be described with reference to FIGS. 16 to 18. FIGS. 16 to 18 are explanatory diagrams showing a flow of the rescue procedure of the modification example 2-2. The rescue procedure of this modification example 2-2 concerns a method for acquiring related items possessed by each related item for each related item of an appropriate item in the descending order in terms of the degree of relation so as to give them to the appropriate item.

As shown in FIG. 16, the appropriate item is specified as a seed item by the rescue procedure engine 206 (S232). Next, the rescue procedure engine 206 acquires a related item group of the seed item (S234). Next, the rescue procedure engine 206 executes the processings of steps S236 to S240 for all the items contained in the related item group of the seed item (start of repetitive processing (A)).

Next, the rescue procedure engine 206 acquires an item (hereinafter referred to as a selection item) from the related item group of the seed item (S236). Next, the rescue procedure engine 206 acquires a related item of the selection item and extracts upper related items in the descending order in terms of the degree of relation so as to set them as the related items of the appropriate item (S238). Next, the rescue procedure engine 206 determines whether or not the quantity of the related items of the appropriate item reaches a specified, quantity (S240). If the quantity of the related items of the appropriate item is equal to or larger than the specified quantity, the rescue procedure engine 206 terminates a series of the processings of the rescue procedure.

On the other hand, if the quantity of the related items of the appropriate item is smaller than the specified quantity, the rescue procedure engine 206 selects a selection item having a next highest degree of relation from the related items of the seed items and executes the processings of steps S236 to S240 (continuation of repetitive processing (A)). However, if the processings of steps S236 to S240 are executed on all the related items contained in the related item group of the seed item, the procedure proceeds to the repetitive processing (B) (termination of the repetitive processing (A)).

The repetitive processing (B) is executed about related items contained in the related item group of the seed item repeatedly. First, an item is acquired from the related item group of the seed item by the rescue procedure engine 206 (S242). Next, the rescue procedure engine 206 acquires a related item group (item group 1) of the acquired items (S244). Next, the procedure proceeds to the repetitive processing (C).

The repetitive processing (C) is executed for items contained in the item group 1 repeatedly. The rescue procedure engine 206 acquires an item from the item group 1 (S246). Next, the rescue procedure engine 206 sets upper related items in the descending order in terms of the degree of relation of the related item group of the acquired items as the related items of the appropriate item (S248). Next, the rescue procedure engine 206 determines whether or not the quantity of the related items of the appropriate item reaches the specified quantity (S250). If the quantity of the related items of the appropriate item is equal to or larger than the specified quantity, the rescue procedure engine 206 terminates a series of processings concerning the rescue procedure.

On the other hand, if the quantity of the related items of the appropriate items is smaller than the specified quantity, the rescue procedure engine 206 selects other items contained in the item group 1 and executes processings of steps S246 to S250 on those items (continuation of repetitive processing (C): FIG. 17). If the processings of steps S246 to S250 are executed about all the items contained in the item group 1 (termination of repetitive processing (C): FIG. 17), the rescue procedure engine 206 returns to step S242, in which it acquires other item from the related item group of the seed item and executes processings subsequent, to step S244 (continuation of repetitive processing (B)). However, if a series of the processings concerning the repetitive processing (B) is executed about all the items contained in the related item group of the seed item, the procedure proceeds to the repetitive processing (D) (FIG. 17) (termination of repetitive processing (B)).

See FIG. 17. The repetitive processing (D) is executed for all the items contained in the item group 1 repeatedly. The rescue procedure engine 206 acquires an item from the item group 1 (S252). Next, the rescue procedure engine 206 acquires related items (item group 2) of the item acquired in step S252 (S254). Next, the rescue procedure engine 206 proceeds to repetitive processing (E).

The repetitive processing (E) is executed for items contained in the item group 2 repeatedly. The rescue procedure engine 206 acquires an item from the item group 2 (S256). Next, the rescue procedure engine 206 sets upper related items in the descending order in terms of the degree of relation of the related item group of the acquired items as the related items of the appropriate item (S258). Next, the rescue procedure engine 206 determines whether or not the quantity of the related items of the appropriate item reaches the specified quantity (S260). If the quantity of the related items of the appropriate item is equal to or larger than the specified quantity, the rescue procedure engine 206 terminates a series of processing of the rescue procedure.

On the other hand, if the quantity of the related items of the appropriate item is smaller than the specified quantity, the rescue procedure engine 206 selects other item contained in the item group 1 and executes the processings of steps S256 to S260 on that item (continuation of repetitive processing (E): FIG. 18). If the rescue procedure engine 206 executes the processings of steps S256 to S260 on all the items contained in the item group 2 (termination of repetitive processing (D): FIG. 18), the procedure returns to step S252, in which the rescue procedure engine 206 acquires other item from the item group 1 and executes processings subsequent to step S254 (continuation of repetitive processing (D)). However, if a series of the processings about the repetitive processing (D) is executed on all the items contained in the item group 1, the procedure proceeds to the repetitive processing (F)(FIG. 18) (termination of repetitive processing (D)).

The rescue procedure engine 206 executes the same series of processings as the repetitive processing (D) on item groups 2 to item group M−1 while the procedure proceeds to the repetitive processing (F) after the repetitive processing (D) is terminated. After that, the rescue procedure engine 206 proceeds to repetitive processing (F).

See FIG. 18. The repetitive processing (F) is executed on all items contained in the item group M repeatedly. The rescue procedure engine 206 acquires an item from the item group M (S262). Next, the rescue procedure engine 206 acquires a related item (item group M+1) of the item acquired in step S262 (S264). Next, the rescue procedure engine 206 proceeds to repetitive processing (G).

The repetitive processing (G) is executed on items contained in the item group M+1 repeatedly. The rescue procedure engine 206 acquires an item from the item group M+1 (S266). Next, the rescue procedure engine 206 sets upper related items in the descending order in terms of the degree of relation of the related item group of the acquired items as the related items of the appropriate item (S268). Next, the rescue procedure engine 206 determines whether or not the quantity of the related items of the appropriate item reaches the specified quantity (S270). If the quantity of the related items of the appropriate item is equal to or larger than the specified quantity, the rescue procedure engine 206 terminates a series of processings concerning the rescue procedure.

On the other hand, if the quantity of the related items of the appropriate items is smaller than the specified quantity, the rescue procedure engine 206 selects other items contained in the item group M+1 and executes processings of steps S266 to S270 on those items (continuation of repetitive processing (G)). If the processings of steps S266 to S270 are executed about all the items contained in the item group M+1 (termination of repetitive processing (G)), the rescue procedure engine 206 returns to step S262, in which it acquires other item from the item group M and executes processings subsequent to step S264 (continuation of repetitive processing (F)). However, if a series of the processings concerning the repetitive processing (F) is executed about all the items contained in the item group M, the procedure proceeds to the processing of step S272 (termination of repetitive processing CD)).

In step S272, the rescue procedure engine 206 adds items located on upper level of the access weight ranking of all users to the related items of the appropriate item (S272). At this time, the rescue procedure engine 206 executes an addition processing until the quantity of the related items of the appropriate item reaches a predetermined quantity. After that, the rescue procedure engine 206 terminates a series of the processings concerning the rescue procedure.

(Conceptual Explanation)

Figure 19:
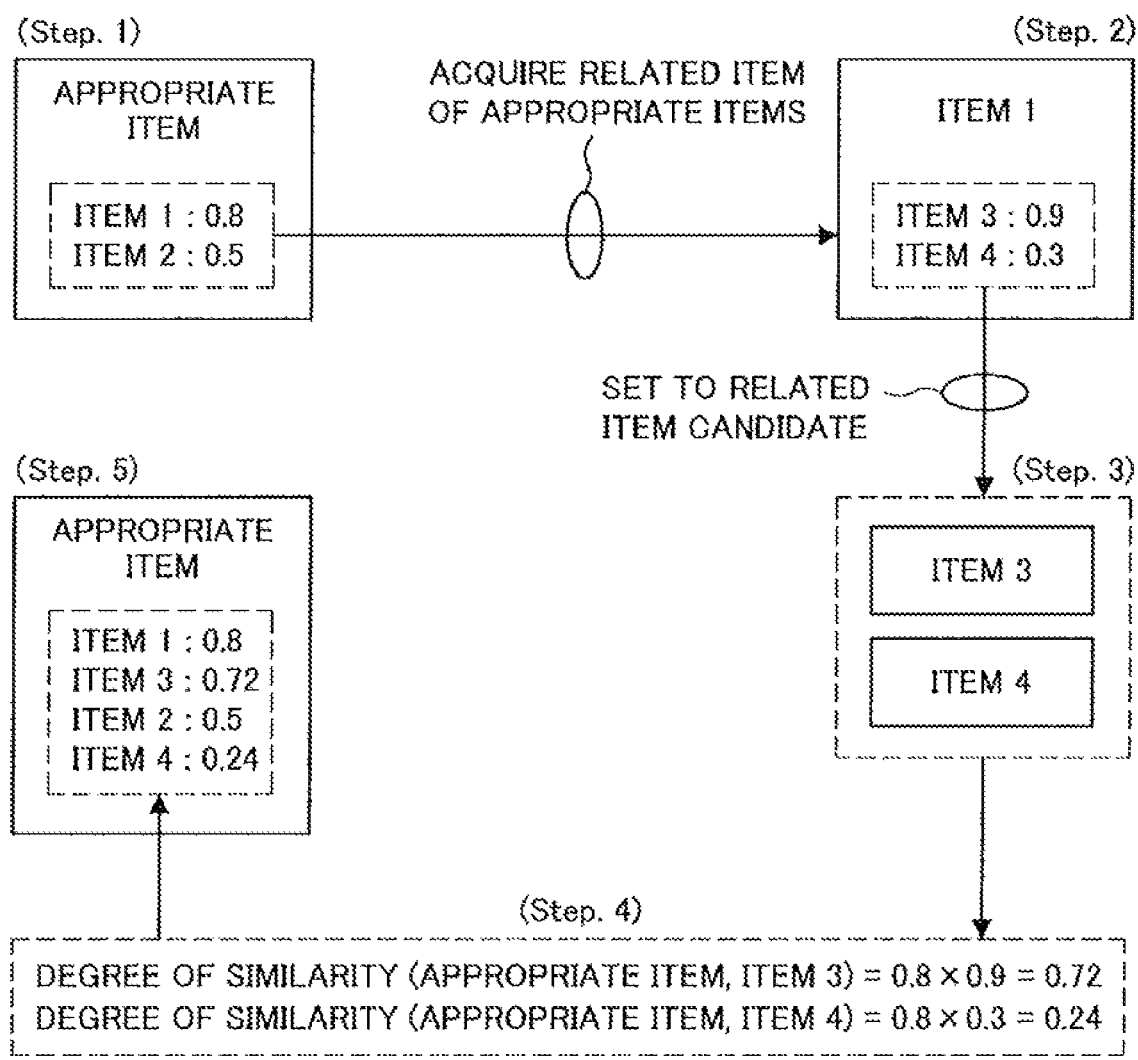
FIG. 19 is an explanatory diagram showing a calculation method for the degree of similarity of the related item according to the embodiment.

The concept of the rescue procedure of the modification example 2-2 will be summarized here with reference to FIG. 19. FIG. 19 is an explanatory diagram showing the rescue procedure of the modification example 2-2 conceptually.

As shown in FIG. 19, the rescue procedure of the modification example 2-2 can be expressed conceptually with five steps. Assume that, two related items (item 1, item 2) are given to the appropriate item in step 1. Assume that the degree of similarity between the appropriate item and item 1 is 0.8. Further, assume that, the degree of similarity between the appropriate item and item 2 is 0.5.

The rescue procedure engine 206 acquires a related item of the appropriate item here. For example, it is assumed that the item 1 is acquired. Further, assume that two related items (item 3, item 4) are given to the item 1 as shown in step 2. Then, assume that, the degree of similarity between the item 1 and item 3 is 0.9 and the degree of similarity between the item 1 and item 4 is 0.3.

Next, the rescue procedure engine 206 sets related items (item 3, item 4) of the item 1 as a related item candidate (step 3). Next, the rescue procedure engine 206 calculates the degree of similarity between the appropriate item and various related item candidate (item 3, item 4) (step 4). As for a calculation method of this degree of similarity, for example, a method of multiplying the degree of similarity (value A) between the appropriate item and the item 1 by the degree of similarity (value B) between the item 1 and the various related item candidate is available like an expression (7) and an expression (8) below.

[Formula 5]

$$\text{Degree of similarity (appropriate item, item 3)} = \quad (7)$$
$$(\text{value } A) \times (\text{value } B) = 0.8 \times 0.9 = 0.72$$

$$\text{Degree of similarity (appropriate item, item 4)} = \quad (8)$$
$$(\text{value } A) \times (\text{value } B) = 0.8 \times 0.3 = 0.24$$

As described above, a degree of similarity between each related item, candidate and an appropriate item is calculated and the related item candidate is added to the related item of the appropriate item (step 5). At this time, the rescue procedure engine 206 gives upper N items (N is a specified quantity) in the descending order in terms of the degree of similarity of the related items as well as the related items provided by the appropriate item originally.

In the above-described embodiment, as a method for calculating the degree of relation between the appropriate item and each related item candidate, a following modification is possible. For example, assume that the appropriate item is item 1, the related item candidate is item N and items of the item group for use in acquiring the related item candidate are item 2 to N–1. The degree of relation between the item 1 and item N can be expressed as shown in a following expression (9) using these items (items 1 to N). However, it is assumed that, the degree of relation between the items has been normalized to values between 0 and 1.

[Formula 6]

$$\text{Degree of relation (item 1, item } N) = \text{degree of relation}$$
$$(\text{item 1, item 2}) \times \text{degree of relation (item 2, item 3)} \times \text{degree of relation (item 3, item 4)} \times \ldots \times \text{degree of relation (item } N-1, \text{ item } N) \quad (9)$$

The processing is started from an actually related item when the aforementioned method is used. Thus, it can be estimated to acquire an item having a relation to some extent.

[Calculation Method of Related Item]

Figure 20:
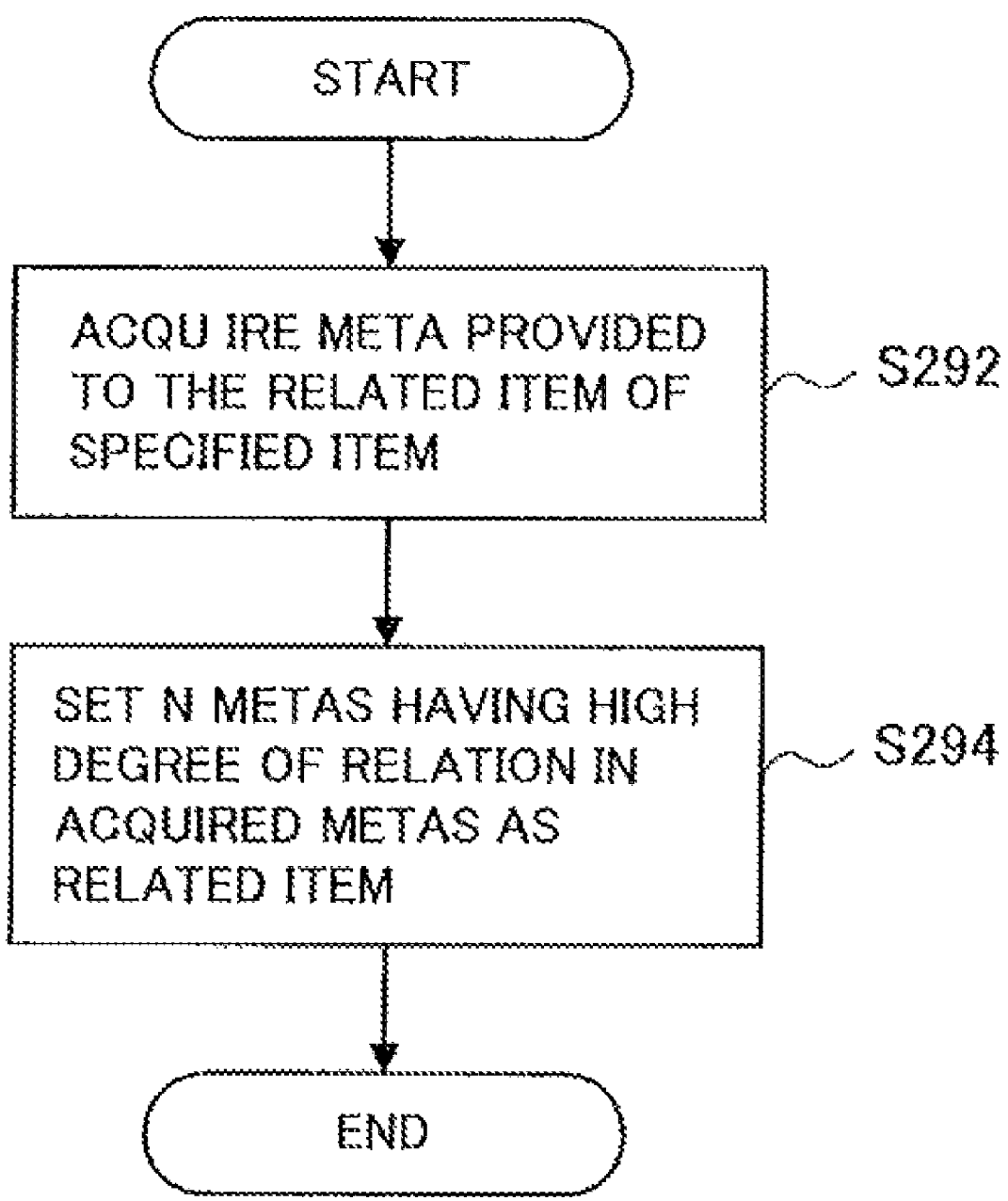
FIG. 20 is an explanatory diagram showing a flow of the related item providing method according to the embodiment.

Here, a method for calculating the related items based on information stored in the related item meta DB 110 will be described with reference to FIG. 20. FIG. 20 is an explanatory diagram showing a flow of the calculation method of the related items of this embodiment. The calculation processing of the related item described below is executed mainly by the recommendation engine 112. In the meantime, a relatively rapid operation can be expected by using this method.

As shown in FIG. 20, a meta given to the related item of a specified item is acquired from the related item meta DB 110 by the recommendation engine 112 (S292). Next, upper N metas of the acquired metas are set up in the related items in the descending order in terms of the degree of relation by the recommendation engine 112 (S294).

The recommendation engine 112 can simply sort the metas of the related items in the order of the degree of relation and set up them in the related items. However, the recommendation engine 112 can calculate a related item by combination with information about the degree of similarity or the like using other meta information than the meta of the related item possessed by each item. For example, the recommendation engine 112 can calculate the related item by combination with a result by the collaborative filtering and a result by the content based filtering. Then, these methods will be described briefly below.

(Calculation Method of Related Item by Calculating the Degree of Similarity)

As a method for calculating the degree of similarity between item information vectors, for example, methods by calculating the inner product of item information vector, cosine scale, Euclidean distance and the like are available. The method by using the inner product of the item information vector will be described here.

Assume that the meta contained in an assembly A of the meta types possessed by the item is a. Further, assume that the weight of the meta a is Wa. Further, assume that the meta type vector to which the meta a of the appropriate item X belongs is Xa and that the meta type vector to which the meta a of an item Y which is a calculation target (hereinafter referred to as target item) is Ya. The degree of similarity between the appropriate item and target, item is calculated according to an expression (10) below using such, an expression.

[Formula 7]

$$\text{Degree of similarity } (X,Y) = \Sigma_{a \in A}(|Xa \cdot Ya| \times Wa) \quad (10)$$

In the meantime, although in the above expression (10), a weight Wa is multiplied to the inner product of two meta type vectors (Xa, Ya), the weight of each meta may be set to be multiplied to each meta type vector.

Modification Example

Similarity Degree Calculation Method

Figure 21:
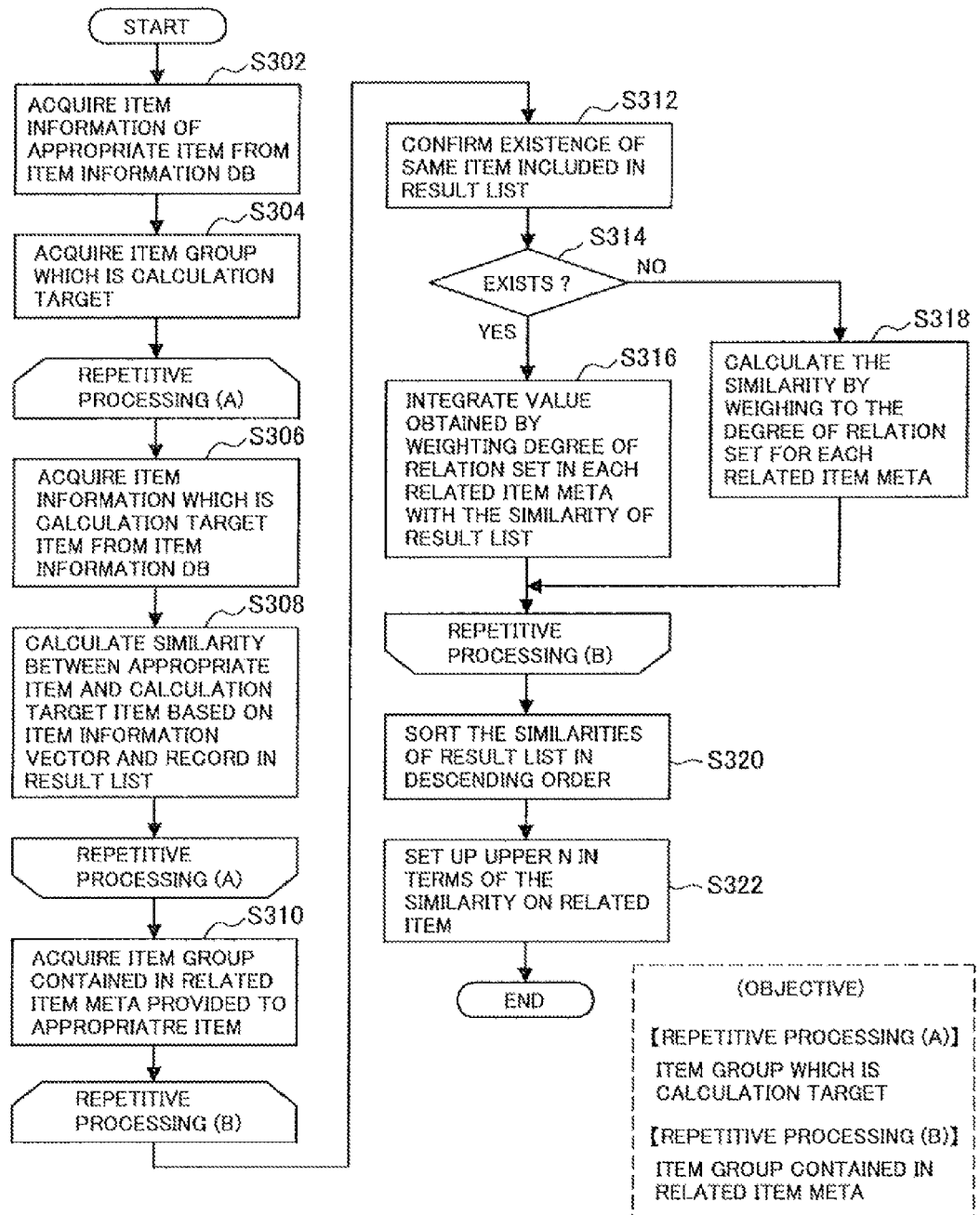
FIG. 21 is an explanatory diagram showing a flow of the related item providing method according to the embodiment.

Here, the modification example of the similarity degree calculation will be described with reference to FIG. 21. FIG. 21 is an explanatory diagram showing a flow of the calculation method for the related item using the similarity degree calculation method of this modification example. According to this modification example, the degree of similarity is calculated with a vector of each item between the appropriate item and target item group and the degrees of relation of items contained in the related item meta possessed by the appropriate item are integrated. Further, a final degree of similarity is calculated from that integrated value and upper N items are calculated as the related items in the descending order in terms of the degree of similarity.

As shown in FIG. 21, item information of the appropriate item is read out from the item information DB 114 by the recommendation engine 112 (S302). Next, an item group (hereinafter referred to as a target item group) which is a calculation target, is selected by the recommendation engine 112 (S304). Next, the repetitive processing (A) is executed. This repetitive processing (A) is executed for a target item group repeatedly. First, the recommendation engine 112 selects a target item (start of repetitive processing (A)) from the target item group so as to acquire the item information of that target item from the item information DB 114 (S306).

Next, the recommendation engine 112 calculates the degree of similarity between the appropriate item and the target item based on the item information vector of the acquired item information (S308). At this time, a calculated degree of similarity is recorded in a result list. After that, other target item is selected by the recommendation engine 112 and the processings of steps S306, S308 are executed (continuation of repetitive processing (A)). If the processings of steps S306, S308 are executed on all the target items contained in the target item group, the recommendation engine 112 proceeds to the processing of step S310 (termination of repetitive processing (A)).

In step S310, an item group contained in the related item meta given to the appropriate item is acquired by the recommendation engine 112 (S310). Next, the recommendation engine 112 proceeds to the repetitive processing (B). This repetitive processing (B) is executed on all the items contained in the item group of the related item meta repeatedly. First, the recommendation engine 112 selects an item from the acquired item group (start of repetitive processing (B)) and makes a retrieval to see whether or not the same item as that item exists in the result list (S312).

Next, the recommendation engine 112 determines whether or not the same item exists in the result list (S314). If the same item exists in the result list, the recommendation engine 112 proceeds to the processing of step S316. On the other hand, if no same item exists in the result list, the recommendation engine 112 proceeds to the processing of step S318.

In step S316, the degree of relation set for each related item meta is weighted by the recommendation engine 112 and integrated with the degree of similarity contained in the result list (S316). On the other hand, in step S318, a value obtained by weighting the degree of relation set in each related item meta is stored in the result, list as a degree of similarity (S318) by the recommendation engine 112. However, the weight of the related item meta is a value indicating how important the degree of relation of the related item meta is regarded as and given preliminarily.

After that, the recommendation engine 112 selects other item contained in the item group and executes the processings of steps 312 to S316 (or S318) repeatedly (continuation of repetitive processing (B)). If the processings of steps S312 to S316 (or S318) are executed on all the items contained in the item group, the recommendation engine 112 proceeds to the processing of step S320.

In step S320, records of the result list are sorted in the descending order in terms of the degree of similarity by the recommendation engine 112 (S320). Next, the recommendation engine 112 sets upper N items in the descending order in terms of the degree of similarity as the related items of the appropriate item (S322) and terminates a series of the processings concerning calculation of the related items.

(Summary of Related Item Calculation Method by Similarity Degree Calculation)

Figure 22:
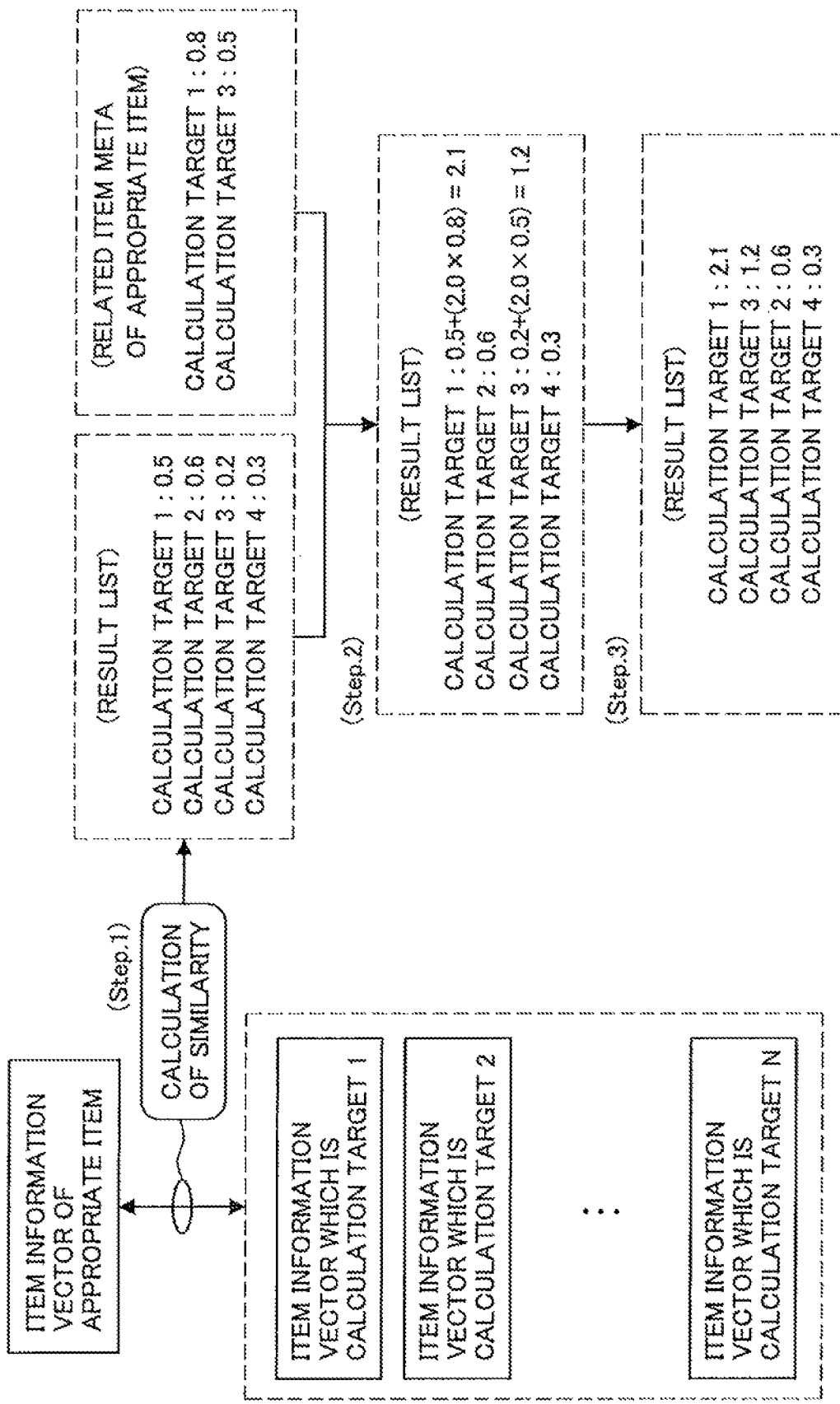
FIG. 22 is an explanatory diagram showing a calculation method for the degree of similarity of the related item according to the embodiment.

The calculation method of the related item by similarity degree calculation will be described conceptually with reference to FIG. 22. FIG. 22 is an explanatory diagram showing the calculation method of the related item by the aforementioned similarity degree calculation conceptually.

As shown in FIG. 22, the degree of similarity is calculated based on the item information vector of an appropriate item and the item information vector of a target, vector by the recommendation engine 112 (step 1). The degree of similarity calculated here is recorded in the result list for each target item. Further, the degree of similarity of the related item meta of the appropriate item is added to the degree of similarity recorded in the result list (step 2). At this time, the degree of similarity of each target item with respect to the related item of the appropriate item is multiplied by each predetermined weight. Then, that multiplication value is added to the degree of similarity of each target item recorded in the result list. After that, records of the result list, are sorted in the descending order in terms of the similarity (step 3). The recommendation engine 112 extracts the related items in the descending order in terms of the degree of similarity from the result list after sorting and provides them as the related item of the appropriate item.

According to the above-described method, after the calculation of the degrees of similarity is completed between the item information vector of an appropriate item and the item information vector of a target item, the weights of the related item metas are summed up. As an application of this, for example, it is permissible to add the related item meta as an element of the item information vector when the calculation of the similarities is executed between the item information vector of the appropriate item and the item information vector of the target item. The same calculation as the above-mentioned method can be achieved using this method.

(Application 1)

Figure 23:
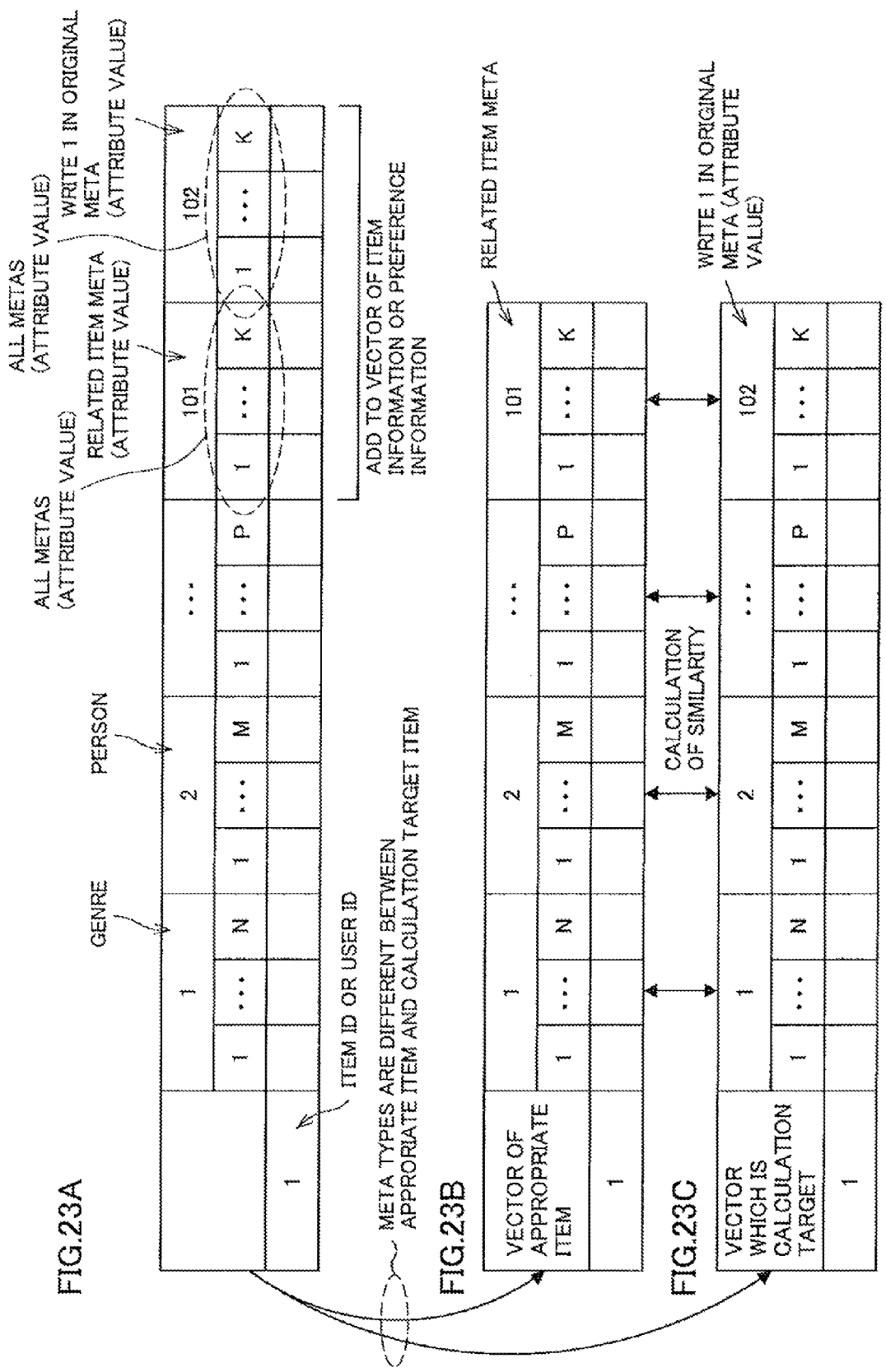
FIGS. 23A, 23B and 23C are an explanatory diagram showing a calculation method for the degree of similarity of the related item according to the embodiment.
Figure 24:
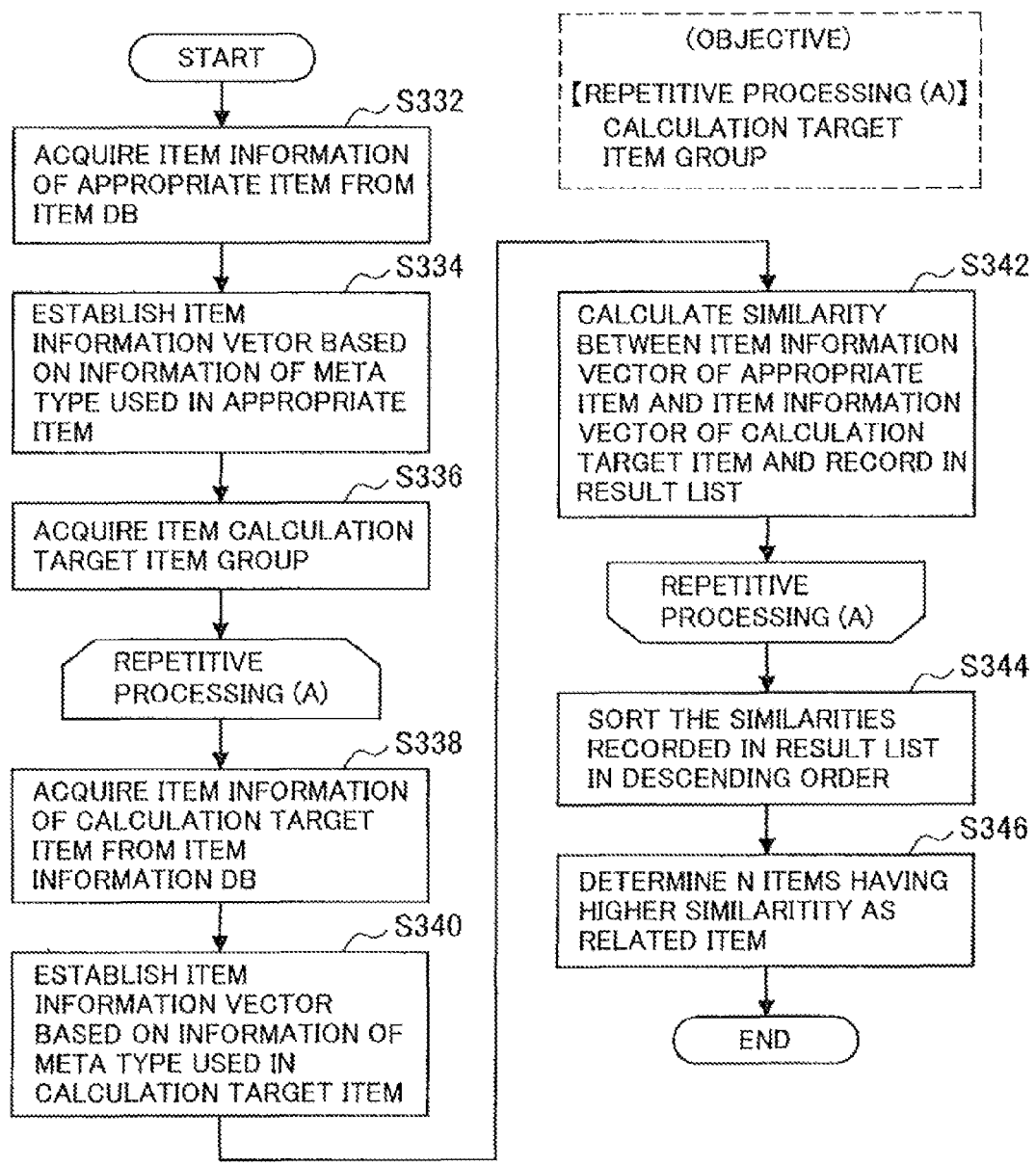
FIG. 24 is an explanatory diagram showing a flow of the related item providing method according to the embodiment.

A method for applying the related item meta to an element of the item information vector will be described briefly with reference to FIGS. 23A, 23B, 23C and 24. FIGS. 23A, 23B and 23C are an explanatory diagram showing a configuration example of the item information vector (or user preference vector) for use in this method. FIG. 24 is an explanatory diagram showing a flow of a determination processing of the related item by the method for applying the related item meta to an element of the item information vector.

As shown in FIG. 24, first, the recommendation engine 112 acquires item information of an appropriate item from the item information DB 114 (S332). Next, the recommendation engine 112 establishes an item information vector based on information of the meta type for use in the appropriate item (S334). Next, the recommendation engine 112 selects a target vector group which is a calculation target, from the all items (S336). Next, the recommendation engine 112 executes the repetitive processing (A). This repetitive processing (A) is executed on all the target, items contained in the target, item group repeatedly.

The recommendation engine 112 selects a target item from the target, item group (start of repetitive processing (A)) and acquires item information of the target item from the item information DB 114 (S338). Next, the recommendation engine 112 establishes an item, information vector based on information of the meta type for use in the target item (S340). Next, the recommendation engine 112 calculates the degree of similarity between the item information vector of the appropriate item and the item information vector of the target item and records its calculation result in the result list (S342). Next, the recommendation engine 112 selects other target, vector contained in the target vector group and executes the processings of steps S338 to S342 for that target vector again (continuation of repetitive processing (A)). However, if the processings of steps S338 to S342 are executed on all the target vectors contained in the target vector group (termination of repetitive processing (A)), the recommendation engine 112 proceeds to the processing of step S344.

In step S344, records of the result list are sorted in the descending order of the degree of similarity by the recommendation engine 112 (S344). Next, the recommendation engine 112 extracts upper N items in the descending order of the degree of similarity from the result list and determines them as the related items of the appropriate item (S346). After that, the recommendation engine 112 terminates a series of processings concerning a calculation of the related items based on the similarity degree calculation.

Use of this method enables a rapid calculation to be achieved because it can calculate a result in which elements of the collaborative filtering and the content based filtering are mixed up and further calculation of the content based filtering and calculation of the collaborative filtering are carried out at the same time.

(Application 2)

A method of obtaining a result mixed with the element of the collaborative filtering by applying the degree of similarity between related item metas to the result of the content based filtering, different from the above-described method can be considered as an application example. In this case, the configuration of the item information vector (or user preference vector) is deformed as shown in FIGS. 25A, 25B, 25C. Because the flow of a basic processing is substantially the same as FIG. 24, a detailed description thereof is not repeated here.

[Related Item Providing Method]

Figure 26:
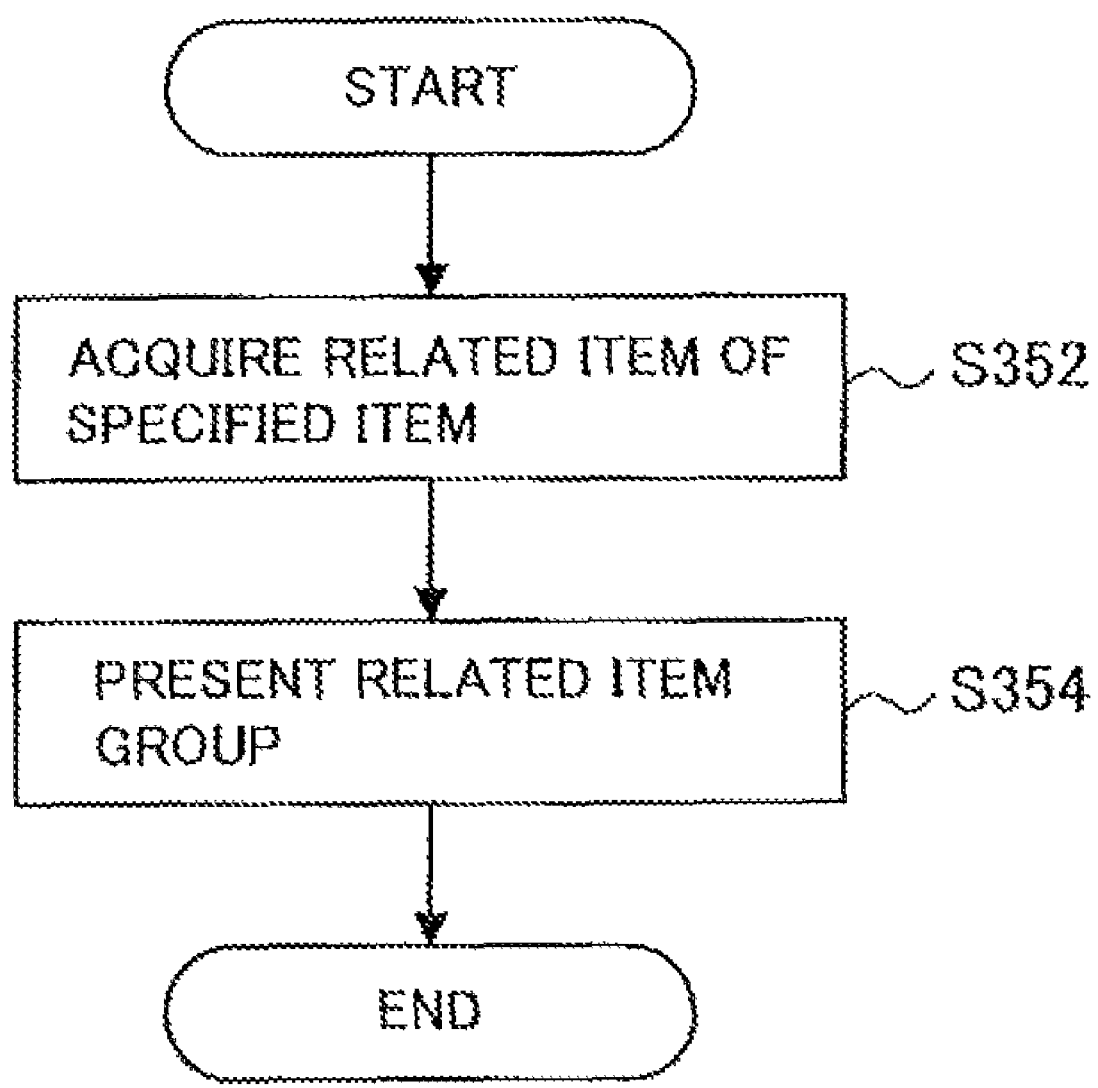
FIG. 26 is an explanatory diagram showing a flow of the related item providing method according to the embodiment.
Figure 27:
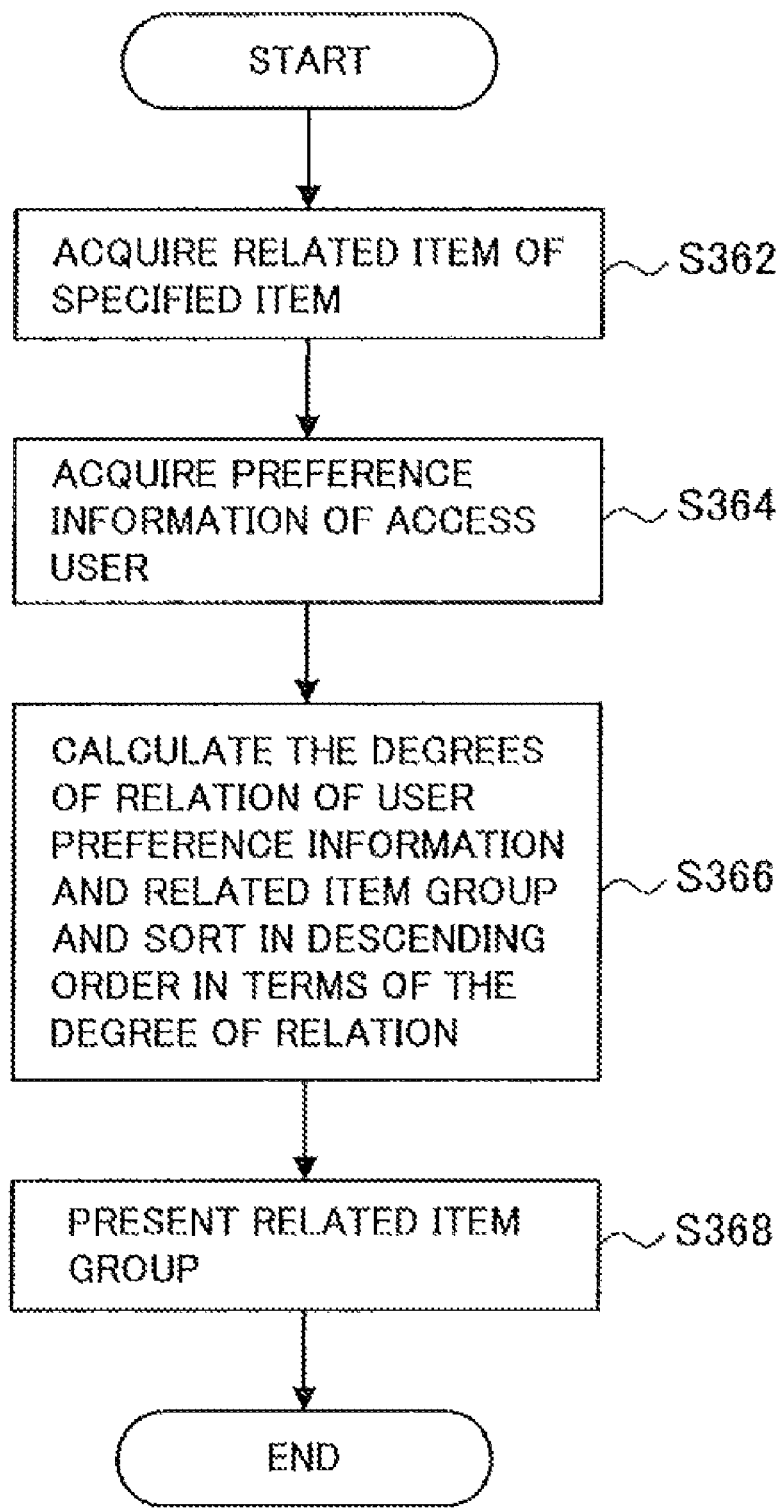
FIG. 27 is an explanatory diagram showing a flow of the related item providing method according to the embodiment.

Next, the providing method of the related item by the recommendation engine 112 will be described with reference to FIGS. 26 and 27. FIG. 26 is an explanatory diagram showing a flow of a series of processings concerning the providing method of the related item. FIG. 27 is an explanatory diagram showing a modification example of the processing shown in FIG. 26.

As shown in FIG. 26, the recommendation engine 112 acquires a related item of an item, specified by a user via the information apparatus 10 (S352). Next, the recommendation engine 112 calculates upper N related items in the descending order of the degree of relation of the related item metas and provides that related item group to the information apparatus 10 (S354).

According to the method shown in FIG. 26, the recommendation engine 112 calculates the related items without using user preference. Thus, what preference an accessing user has is not considered and consequently, the same item is presented as a related item even if the preference is different. Thus, the processing of FIG. 27 shows a modification of this method so as to enable a related item considering the user preference to be presented. According to the processing of FIG. 27, it is considered that the related item meeting the preference of the accessing user can be presented using the relation between the items. Then, the processing of FIG. 27 will be described.

As shown in FIG. 27, first, the recommendation engine 112 acquires a related item of an item specified by a user via the information apparatus 10 (S362). Next, the recommendation engine 112 acquires the preference of a user who accesses the appropriate item (hereinafter referred to as an appropriate user) from the user preference information DB 204 (S364). Next, the recommendation engine 112 calculates the degree of relation between the preference information of the appropriate user and the related item group acquired in step S362 and sorts the items contained in the related item group in the descending order of the degree of relation (S366). Next, the recommendation engine 112 calculates upper N related items in the descending order of the degree of relation of the related item group and presents the related item group to the information apparatus 10 (S368).

The first and second embodiments of the present invention have been described above. The various modification examples and application examples of each embodiment have been described. By applying the art concerned with these embodiments, the related item which considers user preference like the collaborative filtering can be presented within the frame of the content based filtering. Further, even if the quantity of users is small, the related item is presented using the degree of similarity between the items, whereby leading to providing a solution means for the cold start issue. If further speaking, the related item can be presented to an item never referred to previously. Conversely, the related item can be presented to an item having a small number of met as also.

As described above, various effects can be obtained using the art of the above-described embodiments. Then, this effect is useful for widening the range of the preference possessed by user himself or herself. Conversely, recommendation of a related item meeting the latent, preference of user is achieved.

[Hardware Configuration]

Figure 28:
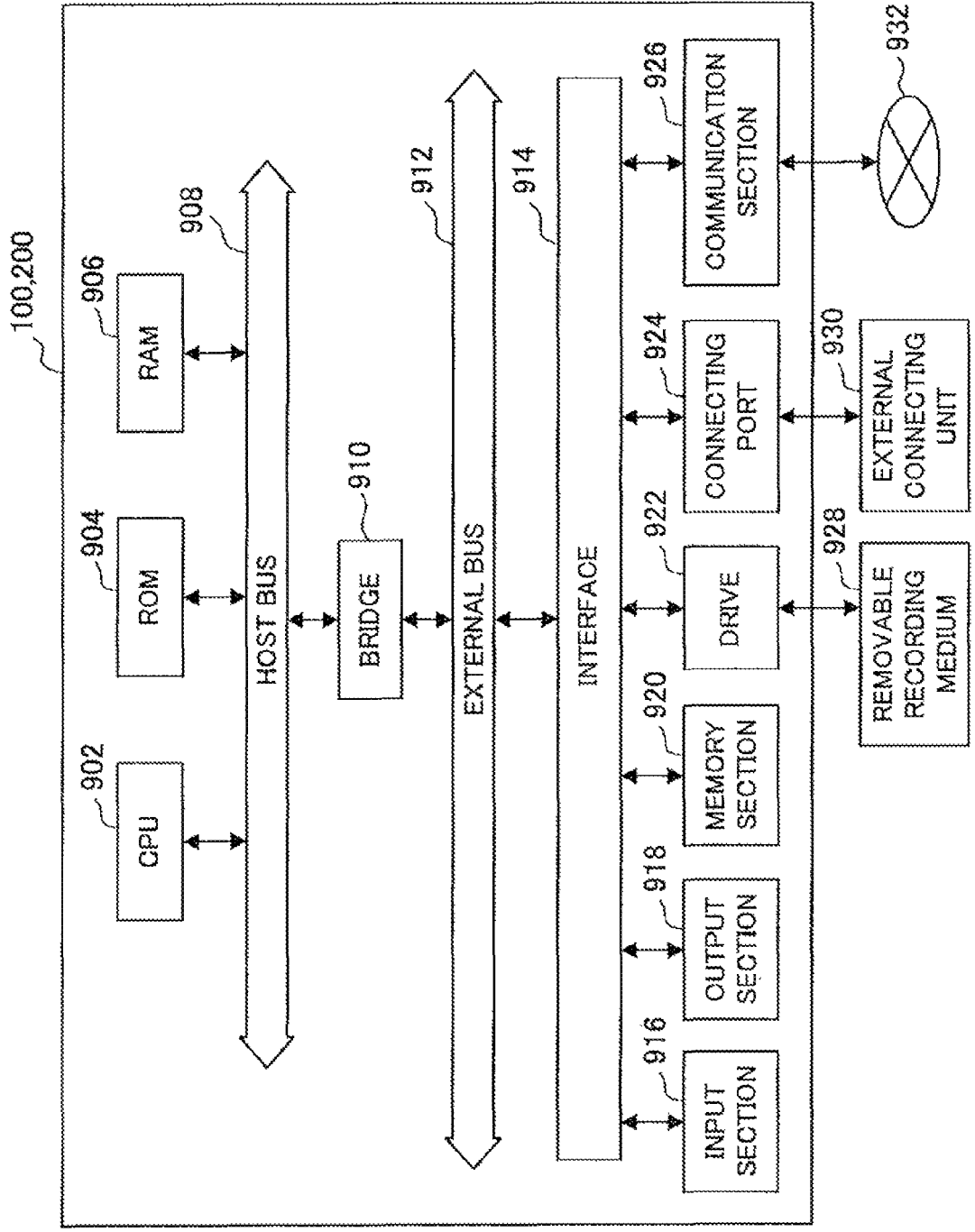
FIG. 28 is an explanatory diagram showing a hardware configuration example of an information processing apparatus capable of achieving the function possessed by the related item providing system according to each of the embodiments of the present invention.

The functions of the constituent, elements mentioned above can be realized by an information processing apparatus having, for example, a hardware configuration shown in FIG. 28. FIG. 28 is a diagram for explaining a hardware configuration of an information processing apparatus which can realize the functions held by the constituent elements of the apparatus.

As shown in FIG. 28, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage section 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage section 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent, elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit, information input by using the operation unit to the CPU 902 through an input signal.

The output unit 918 is, for example, a display device such as a CRT (Cathode Ray Tube), an LCD (Liquid Crystal Display), a PDF (Plasma Display Panel), or an ELD (Electro-Luminescence Display), an audio output device such as a loudspeaker or headphones, a printer, a mobile phone, or a facsimile that, can visually or auditorily notify a user of acquired information.

The storage section 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memory stick, or an SD memory card (Secure Digital memory card), or the like. As a matter of course, the removal recording medium 928 may be, for example, an IC card (Integrated Circuit Card) on which a non-contact. IC chip is mounted, an electronic device, or the like.

The connection port 924 is a port, such as an USB (Universal Serial Bus) port, an IEEE 1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

It should be understood by those skilled in the art that various modifications, combinations, sub-combinations and alterations may occur depending on design and other factors insofar as they are within the scope of the appended claims or the equivalents thereof.

What is claimed is:

1. An information processing apparatus comprising:
 a first similarity degree calculating section which calculates a degree of similarity between a predetermined item and a first calculation target item;
 a related item determining section which determines a predetermined quantity of calculation target items as one or more related items of the predetermined item, the calculation target items being in a descending order of degree of similarity; and
 a relation degree adding section which, when the first calculation target item is one of the one or more related items related to the predetermined item, adds a degree of relation of the first calculation target item to the degree of similarity of the calculation target item calculated by the first similarity degree calculating section,
 wherein meta information related to the first calculation target item is added to the predetermined item based on a behavior history of a user, the meta information being added to calculate the degree of similarity between the predetermined item and the first calculation target item.

2. The information processing apparatus according to claim 1, further comprising:
 a relation degree acquiring section which acquires a degree of relation of a related item based on the behavior history of the user, for a candidate item which holds the same meta information as the meta information of a predetermined item;
 a similarity degree acquiring section which acquires a first degree of similarity between the predetermined item and the related item or the candidate item;
 a second similarity degree calculating section which calculates a second degree of similarity between the related item or the candidate item and the predetermined item based on the degree of relation and the first degree of similarity; and
 a related item adding section which, when the quantity of the one or more related items determined by the related item determining section is less than the predetermined quantity, selects items in a descending order in terms of the degree of similarity calculated by the second similarity degree calculating section, and adds the selected items to the one or more related items.

3. The information processing apparatus according to claim 2, wherein when the first degree of similarity between the predetermined item and the related item is acquired by the similarity degree acquiring section, the second similarity degree calculating section multiplies the acquired degree of similarity by the degree of relation, and regards the multiplication value as a degree of similarity between the predetermined item and the candidate item; and the related item adding section selects candidate items in a descending order of the second degree of similarity calculated by the second similarity degree calculating section, and adds the candidate items to the one or more related items.

4. The information processing apparatus according to claim 2, wherein when the first degree of similarity between the predetermined item and the candidate item is acquired by the similarity degree acquiring section, the second similarity degree calculating section multiplies the acquired degree of similarity by the degree of relation, and regards the multiplication value as a degree of similarity between the predetermined item and the related item; and the related item adding section selects items in a descending order of degree of similarity calculated by the second similarity degree calculating section, and adds the selected items to the related items.

5. The information processing apparatus according to claim 2, wherein the relation degree acquiring section acquires the degree of relation of the related item for the candidate item which holds meta information, where the meta information has a high degree of priority preliminarily set for each meta information of the predetermined item.

6. The information processing apparatus according to claim 2, further comprising a priority degree setting section which sets the degree of priority of each meta information corresponding to the preference of a user who accesses the predetermined item or statistical data of the meta information held by the predetermined item, wherein the relation degree acquiring section acquires a degree of relation of the related item for the candidate item which holds meta information having a high degree of priority set by the priority degree setting section.

7. The information processing apparatus according to claim 2, wherein the relation degree acquiring section:

acquires the degree of relation of the related item for candidate items which hold all meta information held by the predetermined item, integrates all the degrees of relation for each of the candidate items, and regards the integrated degrees of relation as the degree of relation of the candidate item.

8. The information processing apparatus according to claim 2, wherein assuming that an item related to the predetermined item is a first related item and an item related to a N−1-th related item (N≧2) is a N-th related item, the relation degree acquiring section multiplies all degrees of relation (2≦K≦N) between the K−1-th related item and the K-th related item so as to acquire the degree of relation between the first related item and the N-th related item.

9. The information processing apparatus according to claim 1, further comprising a related item presenting section which sorts and presents to the user, the related items in a descending order of preference of the user.

10. A related item presenting method performed by an information processing apparatus, the method comprising the steps of:

adding meta information related to a first calculation target item to a predetermined item, the meta information being added based on a behavior history of a user;

calculating a degree of similarity between the predetermined item and the first calculation target item;

determining a predetermined quantity of calculation target items as one or more related items of the predetermined item, the calculation target items being in a descending order of degree of similarity; and presenting the one or more related items to a user.

* * * * *